(12) United States Patent
Kito et al.

(10) Patent No.: US 9,549,135 B2
(45) Date of Patent: Jan. 17, 2017

(54) SOLID-STATE IMAGING DEVICE AND IMAGING APPARATUS

(71) Applicant: Panasonic Intellectual Property Management Co., Ltd., Osaka (JP)

(72) Inventors: Takayasu Kito, Osaka (JP); Hiroyuki Amikawa, Kyoto (JP); Masahiro Higuchi, Hyogo (JP); Kenichi Origasa, Osaka (JP); Hiroshi Fujinaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/858,481

(22) Filed: Sep. 18, 2015

(65) Prior Publication Data

US 2016/0014363 A1  Jan. 14, 2016

Related U.S. Application Data

(63) Continuation of application No. PCT/JP2014/001447, filed on Mar. 13, 2014.

(30) Foreign Application Priority Data

Mar. 29, 2013  (JP) ................................ 2013-073928

(51) Int. Cl.
*H04N 5/374* (2011.01)
*H04N 5/3745* (2011.01)
(Continued)

(52) U.S. Cl.
CPC ............ *H04N 5/374* (2013.01); *H04N 5/3577* (2013.01); *H04N 5/378* (2013.01); *H04N 5/3745* (2013.01); *H04N 5/3698* (2013.01)

(58) Field of Classification Search
CPC .... H04N 3/1506; H04N 5/374; H04N 5/3741; H04N 3/1512; H04N 5/3745; H04N 5/37452; H04N 5/37455; H04N 5/37457; H04N 5/3742; H04N 5/3743; H01L 27/14643; H01L 27/14612; H01L 27/14614; H01L 27/14616; H01L 27/14689
(Continued)

(56) References Cited

U.S. PATENT DOCUMENTS 7,755,686 B2  7/2010 Toyama et al.
8,094,226 B2  1/2012 Hattori et al.
(Continued)

FOREIGN PATENT DOCUMENTS

JP  2007-281540  10/2007
JP  2009-253559  10/2009
(Continued)

OTHER PUBLICATIONS

International Search Report issued Jun. 17, 2014 in corresponding International Application No. PCT/JP2014/001447 (with English translation).

*Primary Examiner* — Nelson D. Hernández Hernández
(74) *Attorney, Agent, or Firm* — Wenderoth, Lind & Ponack, L.L.P.

(57) ABSTRACT

A solid-state imaging device includes: a plurality of unit cells each including at least one light receiving unit and an amplifying transistor which outputs an amplified signal corresponding to an amount of the signal charge photoelectrically converted by the light receiving unit; a plurality of vertical signal lines each for receiving an output signal from the amplifying transistor; a pixel power supply line for supplying a power supply voltage to the amplifying transistor; a plurality of constant current source transistors each connected to a different one of the vertical signal lines; and
(Continued)

a bias circuit which controls an amount of current to be supplied to each of the constant current source transistors, based on a variation in the power supply voltage.

20 Claims, 18 Drawing Sheets

(51) Int. Cl.
 *H04N 5/369* (2011.01)
 *H04N 5/357* (2011.01)
 *H04N 5/378* (2011.01)
(58) Field of Classification Search
 USPC .................................................. 348/308, 302
 See application file for complete search history.

(56) References Cited

U.S. PATENT DOCUMENTS

| 8,243,178 | B2 | 8/2012 | Toyama et al. |
| 8,659,682 | B2 | 2/2014 | Matsuda et al. |
| 8,872,092 | B2 | 10/2014 | Ryoki et al. |
| 8,957,364 | B2 | 2/2015 | Ryoki et al. |
| 9,184,192 | B2 * | 11/2015 | Anaxagoras ....... H04N 5/37452 |
| 2003/0179159 | A1 * | 9/2003 | Ohsawa ............... H04N 5/3598 345/55 |
| 2006/0011807 | A1 * | 1/2006 | Lee ....................... H04N 5/3658 250/208.1 |
| 2008/0111905 | A1 | 5/2008 | Toyama et al. |
| 2009/0251576 | A1 | 10/2009 | Hattori et al. |
| 2009/0295968 | A1 | 12/2009 | Matsuda et al. |
| 2010/0253772 | A1 | 10/2010 | Toyama et al. |
| 2010/0264298 | A1 | 10/2010 | Ryoki et al. |
| 2011/0254986 | A1 * | 10/2011 | Nishimura ............ H01L 27/146 348/302 |
| 2011/0279720 | A1 | 11/2011 | Nakagawa et al. |
| 2012/0199723 | A1 * | 8/2012 | Egawa ................. H04N 5/3598 250/208.1 |
| 2013/0201372 | A1 | 8/2013 | Ryoki et al. |
| 2015/0009389 | A1 | 1/2015 | Ryoki et al. |

FOREIGN PATENT DOCUMENTS

| JP | 2009-290628 | 12/2009 |
| JP | 2010-183462 | 8/2010 |
| JP | 2010-268440 | 11/2010 |
| JP | 2013-51527 | 3/2013 |

* cited by examiner

SOLID-STATE IMAGING DEVICE AND IMAGING APPARATUS

CROSS REFERENCE TO RELATED APPLICATIONS

This is a continuation application of PCT International Application No. PCT/JP2014/001447 filed on Mar. 13, 2014, designating the United States of America, which is based on and claims priority of Japanese Patent Application No. 2013-073928 filed on Mar. 29, 2013. The entire disclosures of the above-identified applications, including the specifications, drawings and claims are incorporated herein by reference in their entirety.

FIELD

The present disclosure relates to solid-state imaging devices and imaging apparatuses.

BACKGROUND

As physical quantity distribution detecting apparatuses for detecting distribution of physical quantities, for example, solid-state imaging devices are available in which a plurality of unit cells, each including a light receiving unit (pixel) for detecting the intensity of incident light, are two-dimensionally arranged in rows and columns. Complementary metal-oxide semiconductor (CMOS) image sensors, which can be produced through a process similar to that for CMOS integrated circuits (ICs), are widely known as the solid-state imaging devices.

FIG. 18 illustrates a circuit configuration of a conventional solid-state imaging device disclosed in PTL 1. In the CMOS image sensor including a column-parallel analog-to-digital (AD) converting unit illustrated in FIG. 18, each comparator 2031 includes a capacitor element 2044 between a signal line and a power supply line L11. An operation of the capacitor elements 2044 is intended to solve the noise caused by the voltage drop in the power supply line L11 that occurs when the outputs of the comparators 2031 are collectively inverted.

CITATION LIST

Patent Literature

[PTL 1] Japanese Unexamined Patent Application Publication No. 2007-281540.

SUMMARY

Technical Problem

The conventional solid-state imaging device disclosed in PTL 1, however, has a problem that degradation of the image quality caused by disturbance noise such as power supply noise cannot be reduced.

In particular, in the solid-state imaging device illustrated in FIG. 18, when the capacitance of each floating diffusion (FD) unit 2115 is reduced in order to downsize (miniaturize) the device, and to convert the signal charge photoelectrically converted by a light receiving unit 2111, into a high voltage signal, the amount of variation in potential of the FD unit 2115 due to power supply noise significantly increases. Moreover, in order to achieve a high-speed operation by increasing the driving capability to meet a recent demand for high-speed imaging, the gate width of each amplifying transistor 2114 needs to be increased or the amplifying transistors 2114 need to be used in parallel. Meeting such needs result in an increase in Cgd of the amplifying transistor 2114, leading to a significant increase in the amount of variation in potential of the FD unit 2115 due to the power supply noise. In other words, in order to meet recent demands for high-quality image, low noise, and miniaturization, disturbance noise, such as power supply noise, is a significant problem.

One non-limiting and exemplary embodiment provides a solid-state imaging device which suppresses disturbance noise such as power-supply noise.

Solution to Problem

In order to solve the above problem, a solid-state imaging device according to one aspect of the present disclosure includes: an imaging region including a plurality of unit cells arranged in rows and columns, each of the unit cells including at least one light receiving unit, a transfer transistor which transfers a signal charge photoelectrically converted by the at least one light receiving unit, and an amplifying transistor which outputs an amplified signal corresponding to an amount of the signal charge; a plurality of column signal lines each connected to a source electrode of the amplifying transistor, for receiving an output signal from the amplifying transistor; a pixel power supply line connected to a drain electrode of the amplifying transistor, for supplying a power supply voltage to the amplifying transistor; a plurality of constant current source transistors each connected to a different one of the column signal lines; and a bias circuit which controls an amount of current to be supplied to each of the constant current source transistors, based on a variation in the power supply voltage.

With the above configuration, a variation in the power supply voltage is transmitted to the unit cell, causing noise in the vertical signal line. However, the bias circuit varies the constant current of the amplifying transistor in accordance with the variation in the power supply voltage. Accordingly, the power supply noise can be cancelled in a wide range of frequencies from low to high frequencies, independently of the frequency band of the vertical signal line.

Moreover, a solid-state imaging device according to one aspect of the present disclosure includes: an imaging region including a plurality of unit cells arranged in rows and columns, each of the unit cells including at least one light receiving unit, a transfer transistor which transfers a signal charge photoelectrically converted by the at least one light receiving unit, and an amplifying transistor which outputs an amplified signal corresponding to an amount of the signal charge; a plurality of column signal lines each connected to a source electrode of the amplifying transistor, for receiving an output signal from the amplifying transistor; a pixel power supply line connected to a drain electrode of the amplifying transistor, for supplying a power supply voltage to the amplifying transistor; a reference signal generating circuit which generates a reference voltage which temporally varies based on a variation in the power supply voltage; and an analog-to-digital (AD) converting unit which compares a potential of each of the column signal lines with the reference voltage, and converts an analog voltage which is the output signal into a digital voltage.

With the above configuration, a variation in the power supply voltage is transmitted to the unit cell, causing noise in the vertical signal line. However, the reference voltage is also varied in accordance with the variation in the power supply voltage. This makes the result of the comparison by the AD converting unit independent of the power supply voltage. Accordingly, the power supply noise can be cancelled in a wide range of frequencies from low to high frequencies, independently of the frequency band of the vertical signal line.

Moreover, for example, it may be that the bias circuit includes a voltage-to-current converting circuit having a conversion gain, which is positive, for converting the power supply voltage into a current.

Moreover, for example, it may be that the bias circuit includes: a first capacitor connected to the power supply voltage; and a second capacitor connected to a first node to which a voltage other than the power supply voltage is applied, and an amount of current supplied by each of the constant current source transistors is determined based on a ratio of a capacitance value of the first capacitor to a capacitance value of the second capacitor.

Moreover, for example, it may be that the first node is set to a ground potential.

Moreover, for example, it may be that the first capacitor includes: a second node connected to the power supply voltage; and a third node selectively set to a high impedance state or a low impedance state.

Moreover, for example, it may be that the first capacitor included in the bias circuit comprises a plurality of first capacitors, and the bias circuit further includes a first control transistor connected to the third node included in at least one of the first capacitors, the first control transistor including a function of changing a ratio of capacitance values of the first capacitors to the capacitance value of the second capacitor.

Moreover, for example, it may be that the second capacitor included in the bias circuit comprises a plurality of second capacitors, and the bias circuit further includes a second control transistor connected to a fourth node connected to the at least one of the second capacitors, the fourth node being different from the first node connected to the at least one of the second capacitors, the second control transistor including a function of changing a ratio of the capacitance value of the first capacitor to capacitance values of the second capacitors.

Moreover, for example, it may be that the bias circuit changes the ratio of the capacitance value of the first capacitor to the capacitance value of the second capacitor when the amplifying transistors of two or more of the unit cells are simultaneously activated.

Moreover, for example, it may be that the constant current source transistors and the bias circuit are disposed on physically different sides of the imaging region.

Moreover, for example, it may be that the constant current source transistors and the bias circuit are disposed on a physically same side of the imaging region.

Moreover, for example, it maybe that the reference signal generating circuit includes a third capacitor and a fourth capacitor, and the reference voltage corresponds to a differential voltage between the power supply voltage and a ground potential, the differential voltage varying at a ratio of a capacitance value of the third capacitor to a capacitance value of the fourth capacitor.

Moreover, for example, it may be that the reference signal generating circuit includes: a ramp signal generating circuit; and an attenuator including: a fifth capacitor having a first terminal connected to an output terminal of the ramp signal generating circuit; and a sixth capacitor connected between a second terminal of the fifth capacitor and a ground potential, the attenuator reducing, at a predetermined rate, an amplitude of a ramp signal by voltage division by the fifth capacitor and the sixth capacitor, and the reference signal generating circuit outputs a voltage which is based on a voltage of a voltage division point between the fifth capacitor and the sixth capacitor.

Moreover, for example, it may be that the fourth capacitor includes a plurality of capacitors connected in parallel, and the reference signal generating circuit (i) sets each of a plurality of ground nodes of the capacitors of the fourth capacitor to a power supply potential or the ground potential, and (ii) adjusts, to a predetermined ratio based on a first control signal, a ratio of a total capacitance value of one or more of the capacitors having the ground nodes set to the power supply potential to a total capacitance value of one or more of the capacitors having the ground nodes set to the ground potential.

Moreover, for example, it may be that the sixth capacitor includes a plurality of capacitors connected in parallel, and the reference signal generating circuit (i) sets each of a plurality of ground nodes of the capacitors of the sixth capacitor to a power supply potential or a ground potential, and (ii) adjusts, to a predetermined ratio based on a first control signal, a ratio of a total capacitance value of one or more of the capacitors having the ground nodes set to the power supply potential to a total capacitance value of one or more of the capacitors having the ground nodes set to the ground potential.

Moreover, for example, it may be that the reference signal generating circuit includes: a ramp signal generating circuit; an attenuator including: a fifth capacitor having a first terminal connected to an output terminal of the ramp signal generating circuit; and a sixth capacitor connected between a second terminal of the fifth capacitor and a ground potential, the attenuator reducing, at a predetermined rate, an amplitude of a ramp signal by voltage division by the fifth capacitor and the sixth capacitor; and a buffer circuit which converts a voltage signal of a voltage division point between the fifth capacitor and the sixth capacitor into a voltage signal having a low impedance and outputs the voltage signal having the low impedance, the fourth capacitor includes a plurality of capacitors connected in parallel, and the reference signal generating circuit (i) sets each of a plurality of ground nodes of the capacitors of the fourth capacitor to a power supply potential or a ground potential, and (ii) adjusts, to a predetermined ratio based on a second control signal, a ratio of a total capacitance value of one or more of the capacitors having the ground nodes set to the power supply potential to a total capacitance value of one or more of the capacitors having the ground nodes set to the ground potential.

Moreover, for example, it may be that the reference signal generating circuit further includes a first switch for short-circuiting terminals across the fifth capacitor, and the reference signal generating circuit controls on and off of the first switch based on a third control signal.

Moreover, for example, it may be that the reference signal generating circuit includes: a plurality of seventh capacitors having: first terminals respectively connected to a plurality of second switches; and second terminals commonly connected to an input of a buffer circuit, the second switches each connecting and disconnecting a ground node and an output terminal of a ramp signal generating circuit which outputs a sloped signal having a constant voltage variation per unit time; and an attenuator which varies an attenuation ratio by changing, based on a fourth control signal, a ratio of capacitance values of one or more of the seventh capacitors connected to the output terminal of the ramp signal generating circuit to capacitance values of one or more of the seventh capacitors connected to the ground node, and the reference signal generating circuit includes a function of setting each of the ground nodes to a power supply potential or a ground potential, and adjusts the ratio to a predetermined ratio based on a first control signal.

Moreover, a solid-state imaging device according to one aspect of the present disclosure includes: an imaging region including a plurality of unit cells arranged in rows and columns, each of the unit cells including at least one light receiving unit, and a transfer unit configured to transfer a signal charge photoelectrically converted by the at least one light receiving unit; an amplifying transistor which outputs an amplified signal corresponding to an amount of the signal charge transferred by the transfer unit; a power supply line connected to a drain electrode of the amplifying transistor, for supplying a power supply voltage to the amplifying transistor; a constant current source transistor connected to the amplifying transistor; and a bias circuit which controls an amount of current to be supplied to the constant current source transistor, based on a variation in the power supply voltage.

The present disclosure can be implemented not only as a solid-state imaging device including such characteristic features, but also as an imaging apparatus including the solid-state imaging device.

Advantageous Effects

A solid-state imaging device according to the present disclosure is capable of suppressing disturbance noise such as power supply noise.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Hereinafter, a solid-state imaging device and an imaging apparatus according to each embodiment of the present disclosure will be described in greater detail with reference to the accompanying Drawings. Each of the embodiments described below shows a specific example of the present disclosure. The numerical values, shapes, materials, structural elements, the arrangement and connection of the structural elements, steps, the order of the steps etc. shown in the following embodiments are mere examples, and therefore do not limit the present disclosure.

Embodiment 1

Figure 1:
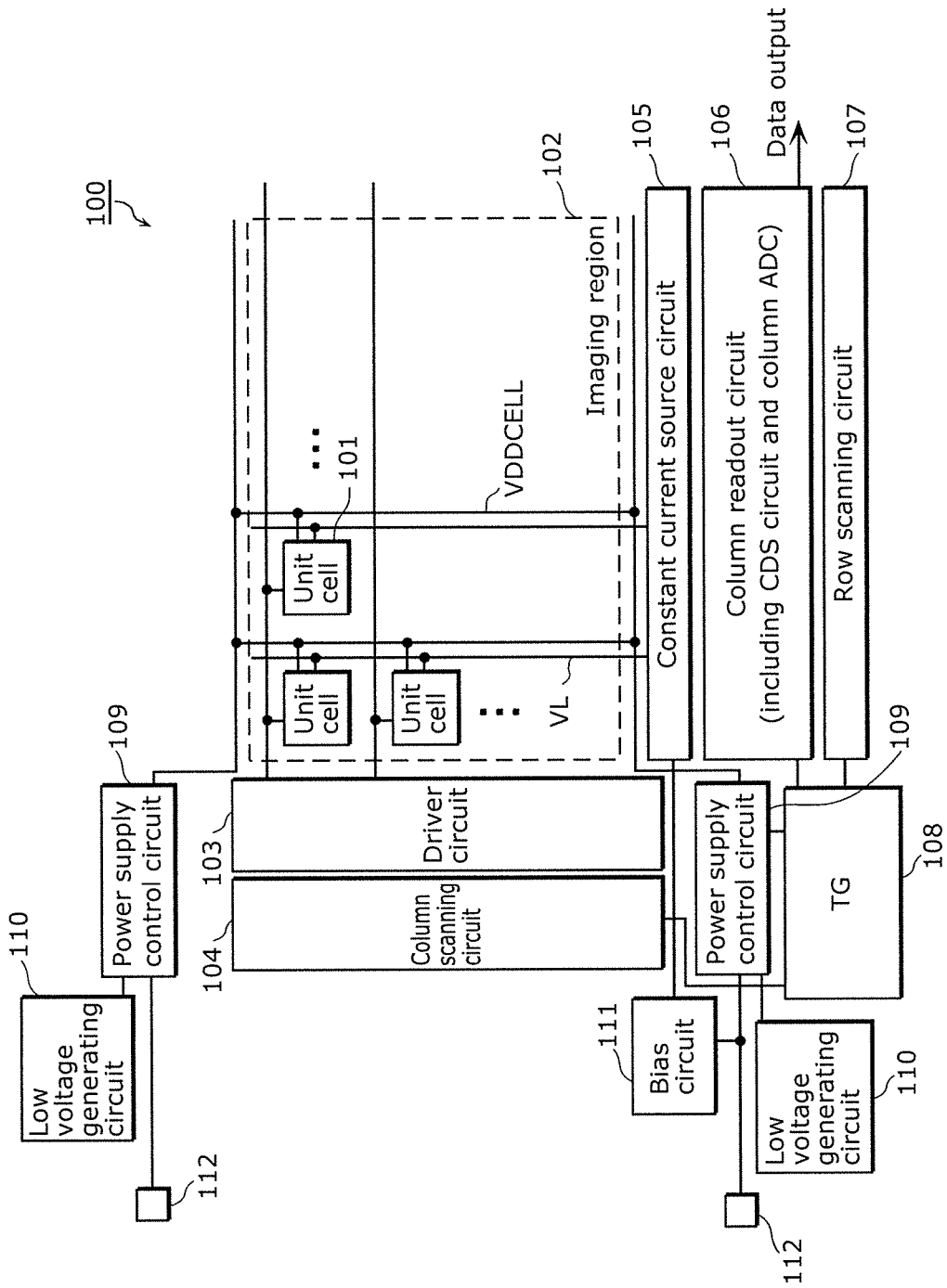
FIG. 1 is a block diagram of a solid-state imaging device according to Embodiment 1.

FIG. 1 is a block diagram of a solid-state imaging device according to Embodiment 1. In FIG. 1, a solid-state imaging device 100 includes: an imaging region 102 including a plurality of unit cells (unit pixels) 101 arranged in rows and columns; a driver circuit 103; a column scanning circuit 104; a plurality of vertical signal lines VL, a constant current source circuit 105; a column readout circuit 106; a row scanning circuit 107; a timing generator (TG) 108; power supply control circuits 109; low voltage generating circuits 110; a bias circuit 111; and a PAD 112.

Each of the unit cells 101 includes: at least one light receiving unit (a pixel, a photodiode, a photoelectric converting element) which performs photoelectric conversion; and a transistor.

The driver circuit 103 drives the imaging region 102.

The vertical signal lines VL transmit signals from the unit cells 101 to respective column circuits, and are connected to the constant current source circuit 105 and the column readout circuit 106.

The column readout circuit 106 includes: noise canceller (correlated double sampling (CDS)) circuits each of which receives pixel signals from a corresponding column and a differential unit; and analog-to-digital converting (ADC) circuits each of which receives the pixel signals from the corresponding CDS circuit. The digital data converted from analog data of the column selected by the row scanning circuit 107 is sequentially output from the solid-state imaging device 100.

The TG 108 generates pulses for operating respective units.

A pixel power supply line VDDCELL for supplying power supply voltage is connected to the unit cells 101 and the power supply control circuits 109 which control the power supply. The power supply control circuits 109 receive voltages from the low voltage generating circuits 110 which generate a voltage lower than a power supply voltage AVDD, and from the PAD 112.

The constant current source circuit 105 is connected to the bias circuit 111 which generates a current generating voltage. The bias circuit 111 is connected to a line from the PAD 112, and supplies the power supply voltage AVDD.

The CDS circuits included in the column readout circuit 106 are, for example, connected to respective columns of the unit cells 101 arranged in rows and columns in the imaging region 102. The CDS circuits perform correlated double sampling (CDS) on the signals output, via the vertical signal lines VL, from the unit cells 101 of the row selected by the column scanning circuit 104. With the CDS processing, signal processing is performed for removing reset noise generated in the unit cells 101 or pixel-specific pattern noise caused by a variation in threshold of the transistors, and the processed pixel signals are temporarily stored.

Each of the ADC circuits includes an analog gain control (AGC) function and an analog to digital converting function. The ADC circuit converts the pixel signal which is an analog signal stored in the CDS circuit into a digital signal.

Here, in order to facilitate understanding of the solid-state imaging device according to Embodiment 1, a general solid-state imaging device will be described with reference to FIG. 2 and FIG. 3.

Figure 2:
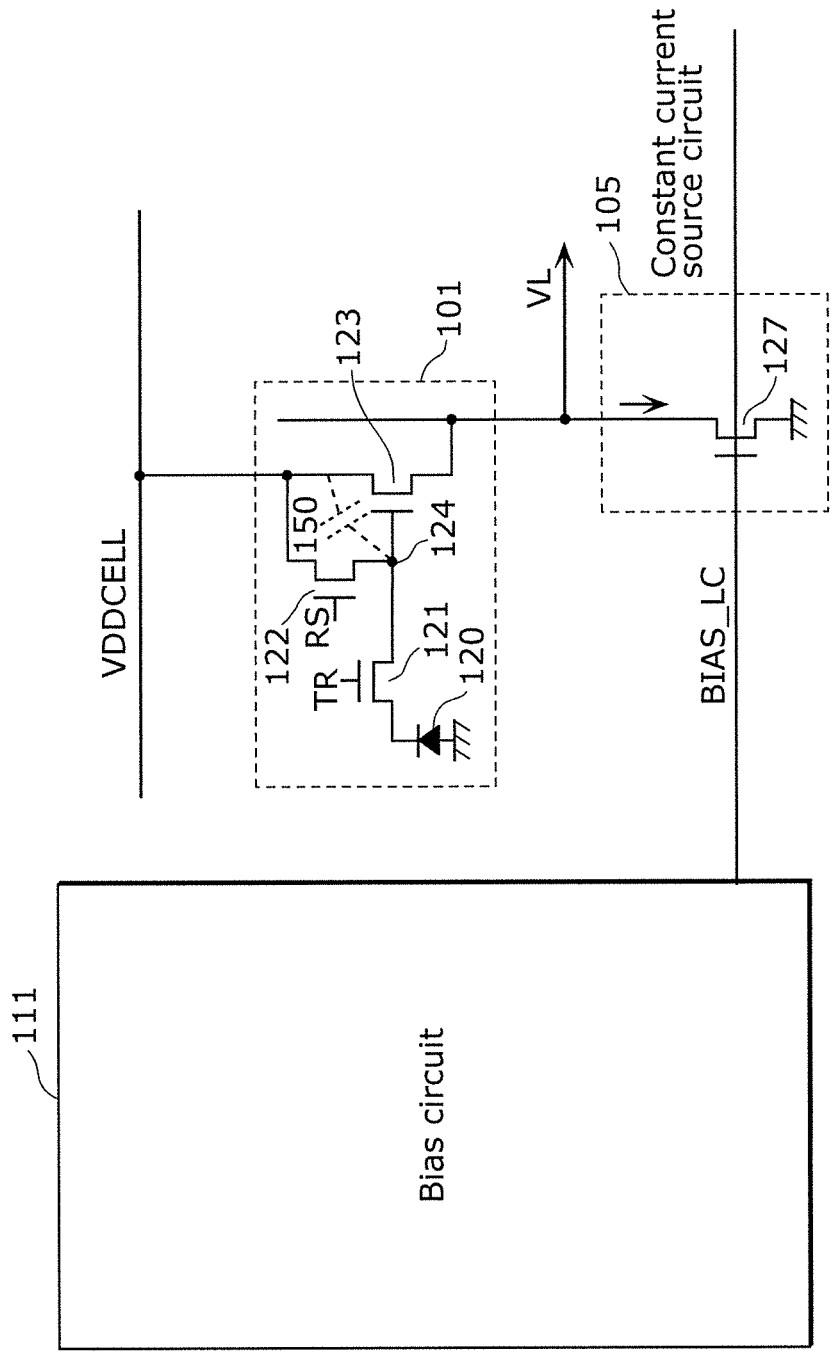
FIG. 2 illustrates an example of a circuit configuration of a pixel unit included in a general solid-state imaging device.

FIG. 2 illustrates an example of a circuit configuration of a pixel unit included in the general solid-state imaging device. FIG. 3 is a circuit configuration of a column readout circuit included in the general solid-state imaging device. In FIG. 2, the unit cell 101 includes: a light receiving unit (a pixel, a photodiode, a photoelectric converting element) 120; an amplifying transistor 123 which outputs an amplified signal corresponding to the amount of signal charge; a transfer transistor 121 which transfers the signal charge photoelectrically converted by the light receiving unit 120; and a reset transistor 122. The unit cell 101 further includes a floating diffusion (FD) unit 124. The reset transistor 122 resets the FD unit 124 to the initial voltage in response to a driving pulse signal RS. The transfer transistor 121 transfers the signal accumulated in the light receiving unit 120 to the FD unit 124 for accumulation, in response to a driving pulse signal TR. The signal accumulated in the FD unit 124 is output to the vertical signal line VL as a voltage by the amplifying transistor 123 and the constant current source circuit 105, and is input to the column readout circuit 106.

Figure 3:
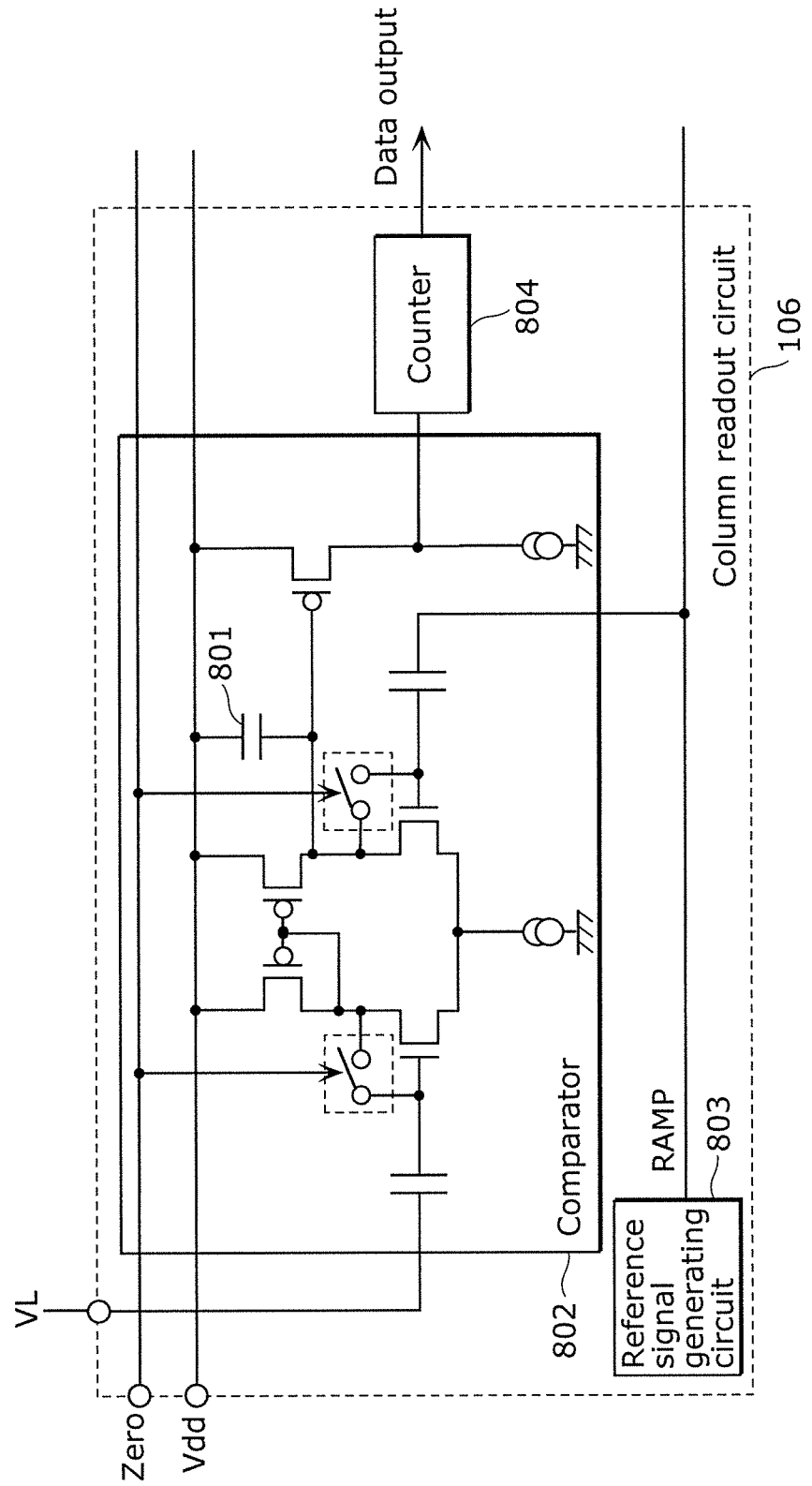
FIG. 3 illustrates a circuit configuration of a column readout circuit included in a general solid-state imaging device.

In FIG. 3, the column readout circuit 106 includes a comparator 802; a reference signal generating circuit 803; and a counter 804. The comparator 802 compares a signal input from the vertical signal line VL with a ramp waveform RAMP output from the reference signal generating circuit 803. The time taken from when the comparator 802 performs the comparison and to when an output of the comparator 802 is inverted is measured by the counter 804, so that AD conversion is performed on the input signal. Here, the inversion of the output of the comparator 802 as a result of the comparison involves a significant variation in current. As a result, the potential of the power supply line Vdd varies. However, a smoothing capacitor 801 disposed between the power supply line Vdd and the output of the comparator 802 maintains the voltage between the gate and source of a grounded source amplifying circuit in a subsequent stage. Accordingly, it is possible to prevent the comparison result of the comparator 802 from varying due to the potential variation in the power supply line Vdd.

However, in the general solid-state imaging device illustrated in FIG. 2 and FIG. 3, for example, the FD unit 124 has a gate-to-drain capacitance (Cgd) 150 which is a parasitic capacitance, due to the parasitic capacitance of the Cgd of the amplifying transistor 123 or the parasitic capacitance between the FD unit 124 and the pixel power supply line VDDCELL. Moreover, when the potential of the pixel power supply line VDDCELL varies due to the disturbance noise such as power supply noise, the FD unit 124 also varies at the ratio of the capacitance of the FD unit 124 to the gate-to-drain capacitance 150. In other words, the variation in potential of the FD unit 124 enters the signal transferred from the light receiving unit 120, resulting in image degradation.

The disturbance noise is further described. In the unit cell 101, the gate-to-drain capacitance 150 is present between the drain electrode and the gate electrode of the amplifying transistor 123, due to the overlap capacitance of the gate or the parasitic capacitance of the line. Here, it is assumed that a pixel signal readout period is a period from when a reset level is output to the vertical signal line VL by the amplifying transistor 123, to when the potential of the FD unit 124, to which the signal charge has been transferred, is output to the vertical signal line VL as a signal level. In this case, when the power supply voltage AVDD varies in a period different from that of the pixel signal readout period, the noise is transmitted to the FD unit 124 via the gate-to-drain capacitance 150. Hence, the noise is transmitted by the amplifying transistor 123 to the vertical signal line VL, resulting in image degradation.

When ΔVdd is a variation in the power supply voltage AVDD, Cfd is the total capacitance of the FD unit 124, and Gsf is the gain of the amplifying transistor 123, the noise ΔVn output to the vertical signal line VL is given as below.

[Math. 1]

$$\Delta V_n = C_{gd}/C_{fd} \times \Delta V_{dd} \times G_{sf} \qquad \text{(Equation 1)}$$

The ΔVn is output to the vertical signal line VL, and is input to the comparator 802. Here, the smoothing capacitor 801 illustrated in FIG. 3 is effective for a variation in power supply of the comparator 802. However, the noise caused by a variation in the power supply of the unit cell 101 cannot be distinguished from the signal (pixel signal) output from the unit cell 101. Hence, the noise cannot be cancelled. In other words, in the general solid-state imaging device illustrated in FIG. 2 and FIG. 3, image degradation caused by the disturbance noise such as power supply noise cannot be suppressed even by using the smoothing capacitor 801.

In contrast, the solid-state imaging device 100 according to Embodiment 1 is capable of preventing the disturbance noise. Details thereof will be described below referring to the drawings.

Figure 4:
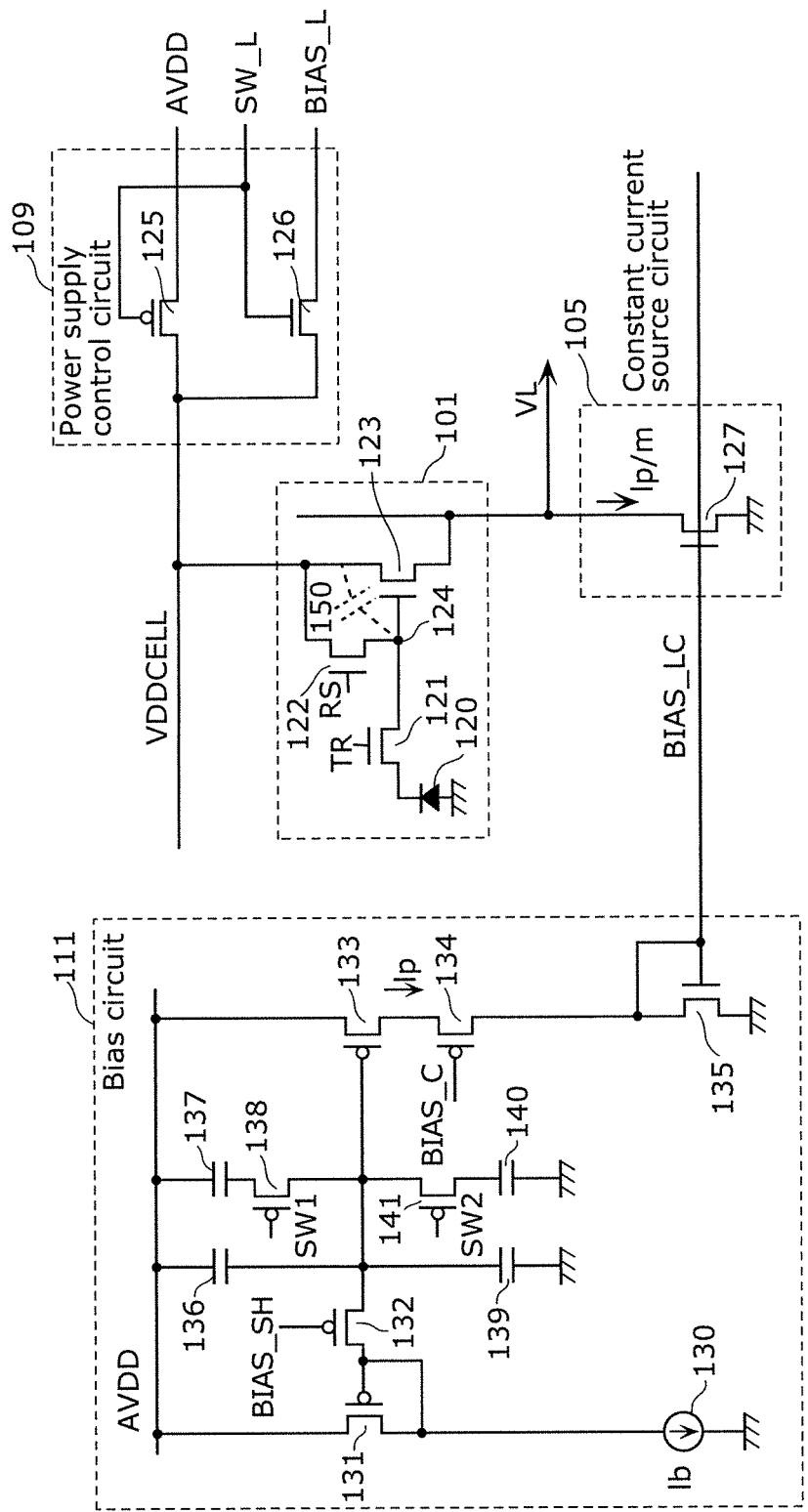
FIG. 4 illustrates an example of configurations of a unit cell and a bias circuit included in the solid-state imaging device according to Embodiment 1.

FIG. 4 illustrates an example of configurations of a unit cell and a bias circuit included in the solid-state imaging device according to Embodiment 1. As FIG. 4 illustrates, the unit cell 101 according to Embodiment 1 includes: at least one light receiving unit (a pixel, a photodiode, a photoelectric converting element) 120; a transfer transistor 121; a reset transistor 122; and an amplifying transistor 123. Each transistor may be, for example, an N-channel MOS transistor. The N-channel MOS transistor (hereinafter, Nch-transistor) is turned on at a high-level gate potential, and is turned off at a low-level gate potential. The P-channel MOS transistor (hereinafter, Pch-transistor) is turned on at a low-level gate potential, and is turned off at a high-level gate potential.

The transfer transistor 121 is connected between the cathode electrode of the light receiving unit 120 and the FD unit 124. The gate electrode of the transfer transistor 121 is connected to a transfer control line TR. The transfer transistor 121 is turned on when a transfer pulse φTR of high level is applied to the gate electrode of the transfer transistor 121 from the transfer control line TR. With this, the signal charge (electrons or holes) photoelectrically converted and accumulated in the light receiving unit 120 is transferred to the FD unit 124.

The reset transistor 122 has a gate electrode connected to a reset control line RS, a drain electrode connected to the pixel power supply line VDDCELL, and a source electrode connected to the FD unit 124. The reset transistor 122 is turned on when a reset pulse φRS of high level is applied to the gate electrode of the reset transistor 122 from the reset control line RS before the signal charge is transferred from the light receiving unit 120 to the FD unit 124. With this, the potential of the FD unit 124 is reset to the power supply voltage AVDD.

The amplifying transistor 123 has a gate electrode connected to the FD unit 124, a drain electrode connected to the pixel power supply line VDDCELL, and a source electrode connected to the vertical signal line VL. The amplifying transistor 123 outputs the potential of the FD unit 124 obtained after being reset by the reset transistor 122, to the vertical signal line VL as a reset level. Furthermore, the amplifying transistor 123 outputs the potential of the FD unit 124 obtained after the signal charge is transferred by the transfer transistor 121, to the vertical signal line VL as a signal level.

The pixel power supply line VDDCELL is connected to a Pch transistor 125 which controls supply of the power supply voltage AVDD. The Pch transistor 125 is turned on when a control pulse φSW_L of low level is applied to the gate electrode of the Pch transistor 125 from a control line SW_L. With this, the power supply voltage AVDD is transmitted to each unit cell 101.

The Nch transistor 126 is connected to the pixel power supply line VDDCELL and a line BIAS_L for supplying a pixel non-selection voltage PBIAS_L. The Nch transistor 126 is turned on when a control pulse φSW_L of high level is applied to the gate electrode of the Nch transistor 126 from the control line SW_L. With this, the non-selection voltage PBIAS_L is transmitted to each unit cell 101.

The constant current source transistor 127 has a drain electrode connected to the vertical signal line VL, and a source electrode connected to the GND. The gate electrode of the constant current source transistor 127 is connected to a line BIAS_LC for supplying a current generating voltage for generating a constant current. This causes a constant current to flow through the amplifying transistor 123, forming a source follower.

The vertical signal line VL is connected to the column readout circuit 106, and transmits the signals generated by the unit cells 101.

The unit cell 101 in FIG. 4 includes one light receiving unit 120 and one transfer transistor 121. However, the configuration thereof is not limited to the example. The unit cell according to the present disclosure may include two or more light receiving units and two or more transfer transistors, and the light receiving units 120 may share the amplifying transistor 123.

It may be that the drain electrode of a control transistor is connected to the FD unit 124, and the source electrode of the control transistor is connected to a capacitor. In such a configuration, a total capacitance Cfd of the FD unit 124 is varied by turning on and off the control transistor. With this, by adjusting the capacitance value Cvdd relative to the power supply voltage AVDD and the capacitance value Cgnd relative to the GND in the bias circuit 111 according to the state of the control transistor, the noise ΔVn that corresponds to the state of the control transistor can be cancelled.

In the above configuration, the drain electrode of the reset transistor 122 and the pixel power supply line VDDCELL are connected, but it may be that they are not connected.

Moreover, the unit cell 101 may include a selection transistor between the source side of the amplifying transistor and the vertical signal line VL.

Now, referring to FIG. 4, the bias circuit 111 which supplies a current generating voltage PBIAS_LC to the line BIAS_LC will be described.

The constant current source 130 which supplies a constant current Ib is connected to the drain electrode and the gate electrode of the Pch transistor 131. The source electrode of the Pch transistor 131 is connected to the power supply voltage AVDD. The constant current source 130 is a general current source, and is, for example, a BGR current source including a band-gap reference circuit. The gate electrode and the drain electrode of the Pch transistor 131 are connected to the source electrode of the Pch transistor 132. The drain electrode of the Pch transistor 132 is connected to the gate electrode of the Pch transistor 133. The gate electrode of the Pch transistor 132 is connected to a sample and hold control line BIAS_SH. The Pch transistor 132 is turned on when a low-level potential is applied to a control pulse φBIAS_SH. Accordingly, the gate electrode and the drain electrode of the Pch transistor 131 and the gate electrode of the Pch transistor 133 are conducted. The source electrode of the Pch transistor 133 is connected to the power supply voltage AVDD, and the drain electrode of the Pch transistor 133 is connected to the source electrode of the Pch transistor 134. Accordingly, the gate electrode of the Pch transistor 131 has a potential same as that of the gate electrode of the Pch transistor 133. This allows the same amount of current as the constant current Ib flowing through the Pch transistor 131 to flow through the Pch transistor 133. By changing the sizes of the Pch transistor 131 and the Pch transistor 133, specifically by changing the gate width W and the gate length L of the transistors, the constant current Ip which flows through the Pch transistor 133 can be varied as desired.

While the amplifying transistor 123 outputs a reset level to the vertical signal line VL and outputs the potential of the FD unit 124 to which the signal charge has been transferred, to the vertical signal line VL as a signal level, a control pulse φBIAS_SH of high level is applied to the gate electrode of Pch transistor 132. Here, the Pch transistor 132 is turned off. With this, it is possible to prevent thermal noise or 1/f noise generated by the constant current source 130 and the Pch transistor 131 from being superimposed on the constant current generating voltage PBIAS_LC and generating noise in the reset level or the signal level of the vertical signal line VL.

In FIG. 4, in order to reduce the charge injection that occurs when the Pch transistor 132 is turned off and a variation in potential of the gate electrode of the Pch transistor 133 caused by coupling due to a variation in the control pulse φBIAS_SH, a Pch transistor for cancelling offset may be connected.

The gate electrode of the Pch transistor 134 is connected to a cascade bias line BIAS_C. A cascade bias voltage PBIAS_C is applied to the gate electrode of the Pch transistor 134. This prevents a variation in potential of the drain electrode of the Pch transistor 134 from being transmitted to the source electrode. Accordingly, it is possible to prevent a variation in potential of the drain electrode of the Pch transistor 133 which flows the constant current Ip from being transmitted to the gate electrode of the Pch transistor 133 due to the parasitic capacitance between the drain electrode and the source electrode, for example, overlap capacitance or the like of the gate, and from varying the constant current Ip.

The drain electrode of the Pch transistor 134 is connected to the drain electrode and the gate electrode of the Nch transistor 135. The Nch transistor 135 has a source electrode connected to the GND, a gate electrode and a drain electrode connected to the line BIAS_LC for supplying a current generating voltage. This causes transmission of the current generating voltage PBIAS_LC to the constant current source circuit 105 in each column. In other words, the Nch transistor 135 serves as a current-to-voltage converting circuit which generates the current generating voltage PBIAS_LC from the constant current IP flowing from the Pch transistor 133.

Since the gate electrode of the Nch transistor 135 and the gate electrode of the constant current source transistor 127 have the same voltage, a desired level of constant current can be supplied to each column by adjusting the ratio of transistors. For example, when the size of the Nch transistor 135 and the constant current source transistor 127 is, specifically, the ratio of W/L is m:1 where W is the gate width and L is the gate length, the current Isf flowing through the constant current source transistor 127 is Ip/m.

The capacitor 136 is a first capacitor having a first terminal, which is a third node, connected to the gate electrode of the Pch transistor 133, and having a second terminal, which is a second node, connected to the power supply voltage AVDD. This is to vary the gate electrode of the Pch transistor 133 by capacitive coupling of the capacitor 136 accordingly when the power supply voltage AVDD which is the source electrode of the Pch transistor 133 varies. This maintains the potential difference between the gate electrode and the source electrode of the Pch transistor 133 constant, stabilizing the constant current Ip.

The capacitor 137 is the first capacitor having a first terminal, which is the third node, connected to the source electrode of the Pch transistor 138, and having a second terminal, which is the second node, connected to the power supply voltage AVDD. The Pch transistor 138 includes a gate electrode connected to a control line SW1, and a drain electrode connected to the gate electrode of the Pch transistor 133. The Pch transistor 138 is turned on when a low potential is supplied to the gate electrode of the Pch transistor 138 via the control line SW1 from a control register R_SW1. Accordingly, a terminal of the capacitor 137 and the gate electrode of the Pch transistor 133 are conducted. In other words, the Pch transistor 138 is a first control transistor which is connected to the third node of the first capacitor, and has a function of changing the ratio of the capacitance values of a plurality of first capacitors to the capacitance value of the second capacitor.

In FIG. 4, a Pch transistor 138a may be disposed between the source electrode of the Pch transistor 138 and the gate electrode of the Pch transistor 131. In other words, a control register R_NSW1 having a polarity opposite to that of the control register R_SW1 is supplied to the gate electrode of the Pch transistor 138a. Here, when the Pch transistor 138 is turned off, the source electrode of the Pch transistor 138 is connected to the gate electrode of the Pch transistor 131 by the Pch transistor 138a. This prevents a high impedance state where the potential is not constant from occurring. Moreover, since the source electrode and the drain electrode of the Pch transistor 138 have approximately the same potential, off-state leakage current of the Pch transistor 138 can be reduced.

The capacitor 139 is a second capacitor having a first terminal connected to the gate electrode of the Pch transistor 133, and a second terminal connected to the GND which is a first node.

The capacitor 140 is the second capacitor having a first terminal connected to the source electrode of the Pch transistor 141, and a second terminal connected to the GND which is the first node. The Pch transistor 141 has a gate electrode connected to a control line SW2, and a drain electrode connected to the gate electrode of the Pch transistor 133. The Pch transistor 141 is turned on when a low potential is supplied to the gate electrode of the Pch transistor 141 via the control line SW2 from the control register R_SW1. Accordingly, a terminal of the capacitor 140 and the gate electrode of the Pch transistor 133 are conducted. In other words, the Pch transistor 141 is a second control transistor which is connected to a fourth node which is connected to the second capacitor and which is different from the first node, and has a function of changing the ratio of the capacitance value of the first capacitor and the capacitance values of a plurality of second capacitors.

In FIG. 4, a Pch transistor 141a may be disposed between the source electrode of the Pch transistor 141 and the gate electrode of the Pch transistor 131. In other words, the control register R_SW2 and the opposite polarity control register R_NSW2 are supplied to the gate electrode of the Pch transistor 141a. Here, when the Pch transistor 141 is turned off, the source electrode of the Pch transistor 141 is connected to the gate electrode of the Pch transistor 131 by the Pch transistor 141a. This prevents a high impedance state where the potential is not constant from occurring. Moreover, since the source electrode and the drain electrode of the Pch transistor 141 have approximately the same potential, off-state leakage current of the Pch transistor 141 can be reduced.

Here, as described referring to Equation 1, when the power supply voltage ΔVdd varies in the positive direction, the noise ΔVn that appears in the vertical signal line VL also varies in the positive direction. On the other hand, the Pch transistors 138 and 141 are turned on when the control registers R_SW1 and R_SW2 become low levels. When the voltage variation ΔVdd in the power supply voltage AVDD is generated, the amount of variation ΔIp in the constant current is given by Equation 2 below.

[Math. 2]

$$\Delta I_p = C_{gnd}/(C_{vdd}+C_{gnd}) \times \Delta V_{dd} \times gm_p \quad \text{(Equation 2)}$$

In other words, the amount of current supplied by the constant current source transistor 127 is determined based on the ratio of the capacitance value of the first capacitor to the capacitance value of the second capacitor. In Equation 2 above, Cvdd is a total capacitance value of the capacitors 136 and 137 relative to the power supply voltage AVDD. Additionally, Cgnd is a total capacitance value of capacitors 139 and 140 relative to the GND, and $gm_p$ is the transconductance of the Pch transistor 133.

Moreover, when Ip/m is the current Isf flowing through the constant current source transistor 127 and $gm_{sf}$ is the transconductance of the amplifying transistor 123, the amount of signal variation ΔVc that appears in the vertical signal line VL due to the amount of current variation ΔIsf is given by Equation 3 below.

[Math. 3]

$$\Delta V_c = -\Delta I_p/(m \times gm_{sf})$$ (Equation 3)

Accordingly, from Equation 2 and Equation 3 above, in the bias circuit 111, when the power supply voltage variation ΔVdd varies in the positive direction, the ΔIp varies in the positive direction, and the amount of signal variation ΔVc that appears in the vertical signal line VL varies in the negative direction. This allows the noise ΔVn generated in the unit cell 101 to be cancelled. In other words, the bias circuit 111 controls the amount of current to be supplied to the constant current source transistor 127, based on the variation in the power supply voltage AVDD. The bias circuit 111 according to Embodiment 1 corresponds to a voltage-to-current converting circuit having a conversion gain, for converting the power supply voltage AVDD into a current, which is positive.

The condition for canceling the ΔVn, (ΔVn+ΔVc=0), is given by Equation 4 below, using coefficient βp representing the size of the Pch transistor 133, coefficient βsf representing the size of the amplifying transistor 123, Equation 1, Equation 2, and Equation 3 above.

[Math. 4]

$$C_{gd}/C_{fd} \times G_{sf} = C_{gnd}/(C_{vdd}+C_{gnd}) \times \sqrt{\beta_P/m \times \beta_{sf}}$$ (Equation 4)

Accordingly, from Equation 4 above, the noise ΔVn generated in the unit cell 101 can be cancelled by adjusting the ratio of the capacitance value Cvdd, relative to the power supply voltage AVDD, of capacitors connected to the gate electrode of the Pch transistor 133, to the capacitance value Cgnd, relative to the GND, of capacitors connected to the gate electrode of the Pch transistor 133 in the bias circuit 111. Moreover, the cancellation of the noise does not influence the DC components of the voltage applied to the gate electrode of the Pch transistor 133, and thus, the DC components of the constant current value Ip does not vary. As a result, in Embodiment 1, it is possible to prevent power consumption of the bias circuit 111 from increasing, and also prevent the operation speed of the bias circuit 111 from decreasing.

Moreover, from Equation 4 above, the amount of current supplied by the constant current source transistor can be adjusted according to the ratio of the capacitance value Cvdd to the capacitance value Cgnd, independently of Vt values of the Pch transistor 133 and the amplifying transistor 123. As a result, noise caused by variations in transistor elements can be cancelled accurately.

Moreover, as illustrated in FIG. 4, the capacitance ratio can be adjusted by disposing the Pch transistor 138 between the capacitor 137 and the gate electrode of the Pch transistor 133 and disposing the Pch transistor 141 between the capacitor 140 and the gate electrode of the Pch transistor 133 and setting the control registers R_SW1 and R_SW2. Accordingly, setting of an optimal value can also be adjusted according to the driving mode.

In Embodiment 1, in the pixel signal readout period, the Pch transistor 132 is turned off and the gate electrode of the Pch transistor 133 has a high impedance state. Hence, noise can be cancelled in a wide range of frequencies from low to high frequencies of the variation in the power supply voltage AVDD. In other words, the third node of the first capacitor is selectively set to a high impedance state or a low impedance state.

Even if the Pch transistor 132 is not included in the circuit, the noise ΔVn generated in the unit cell 101 can be cancelled. In this case, the gate electrode of the Pch transistor 133 is connected to the gate electrode and the drain electrode of the Pch transistor 131. Accordingly, when the frequency of the variation of the power supply voltage AVDD is in the low range, the gate electrode of the Pch transistor 133 is fixed to a given voltage by the Pch transistor 131 while having a low impedance state. Hence, when the Pch transistor 132 is not included in the circuit, the present disclosure is particularly effective when cancelling only the variation of the high-frequency components of the power supply voltage AVDD.

Moreover, since the noise ΔVn generated in the unit cell 101 is cancelled by varying the amount of current Isf supplied to the constant current source transistor 127 to generate the ΔVc in the vertical signal line VL, noise can be cancelled independently of the frequency band of the vertical signal line VL.

One constant current source circuit 105 may be disposed above the imaging region 102 and another constant current source circuit 105 may be disposed below the imaging region 102. In this case, it may also be that one bias circuit 111 is disposed above the imaging region and another bias circuit 111 is disposed below the imaging region 102. The power supply voltage AVDD is supplied to the pixel power supply line VDDCELL from the PADs 112 located above and below the imaging region 102 via the power supply control circuits 109 located above and below the imaging region 102. The variations in the power supply voltage AVDD located above and below the imaging region 102 are transmitted to the unit cell 101. By disposing the bias circuits 111 and the constant current source circuits 105 above and below the imaging region 102, influence from the variations in the power supply voltage AVDD above and below the imaging region 102 can be cancelled, thereby accurately cancelling the noise.

The constant current source transistor 127 and the bias circuit 111 may be disposed on physically different sides of the imaging region 102. Alternatively, the constant current source transistor 127 and the bias circuit 111 may be disposed on the physically same side of the imaging region 102.

Moreover, such a state has been described where, in the unit cell 101, one amplifying transistor 123 is operated relative to the vertical signal line VL. However, the present disclosure is also effective when a plurality of amplifying transistors 123 are operated and pixel signals are mixed in the vertical signal line VL. In this case, in Equation 4 above, coefficient βsf representing the size of the amplifying transistor 123 is changed. Accordingly, the noise ΔVn can be cancelled by adjusting the capacitance value Cvdd relative to the power supply voltage AVDD and the capacitance value Cgnd relative to the GND.

Next, referring to FIG. 5, details of an operation (driving) of the solid-state imaging device 100 according to Embodiment 1 illustrated in FIG. 4 will be described.

Figure 5:
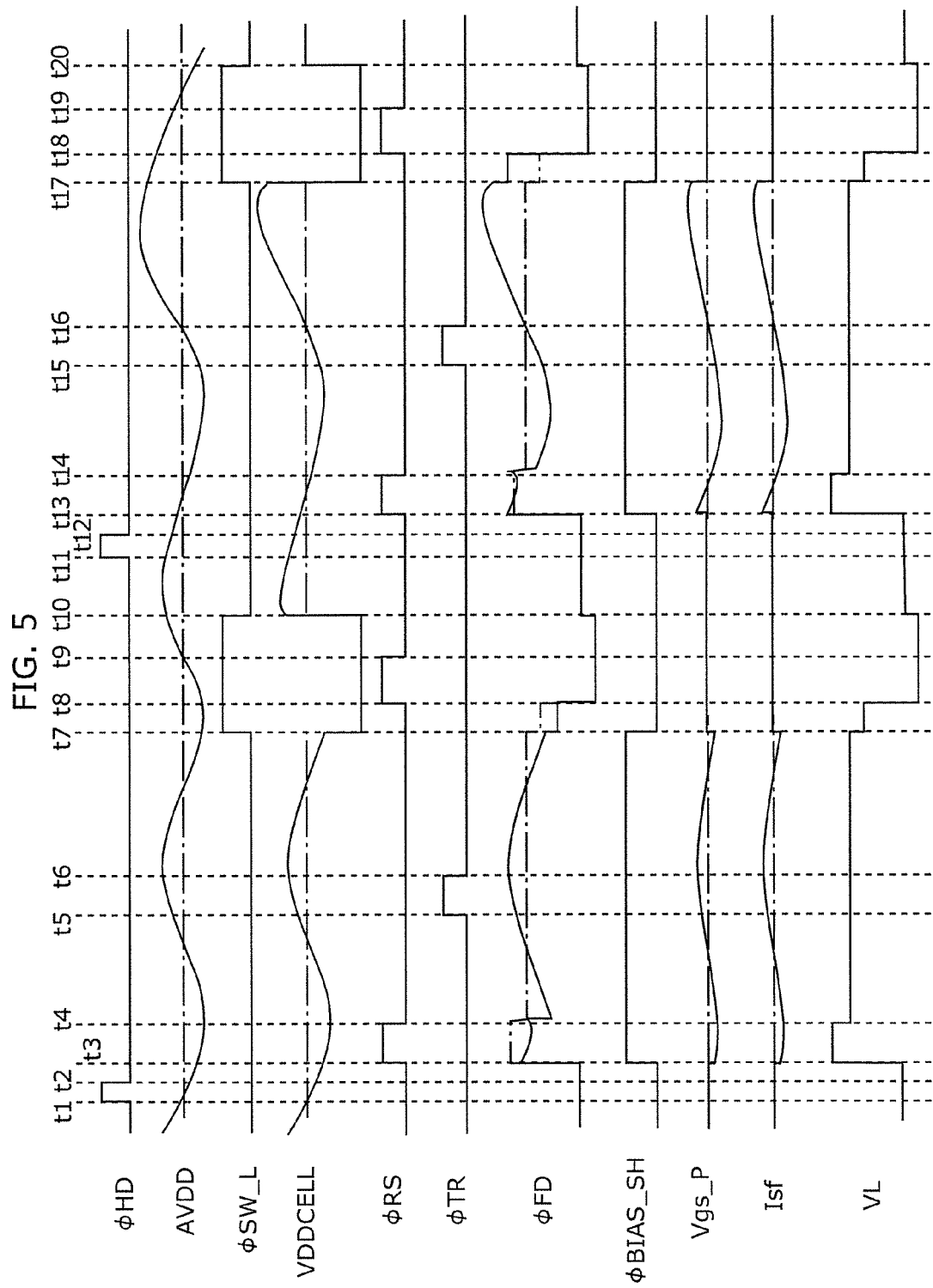
FIG. 5 is a timing chart for describing an operation of the solid-state imaging device according to Embodiment 1.

FIG. 5 is a timing chart for describing an operation of the solid-state imaging device according to Embodiment 1. In FIG. 5, φHD is a synchronization signal pulse voltage for readout of pixel signals, and serves as a reference for the timing generator (TG) 108. φRS is a signal voltage applied to the reset control line RS. φTR is a signal voltage applied to the transfer control line TR. φSW_L is a control pulse voltage applied to the control line SW_L. φBIAS_SH is a signal voltage applied to the sample and hold control line BIAS_SH. φFD is a potential of the FD unit. Vgs_P is the potential difference between the gate electrode and the source electrode of the Pch transistor 133. Isf is a constant current flowing between the source and the drain of the amplifying transistor 123. In FIG. 5, solid-line waveforms indicate cases where the power supply voltage AVDD varies, and dot-and-dash line waveforms indicate cases where the power supply voltage AVDD does not vary. FIG. 5 illustrates a case where the power supply voltage AVDD varies asynchronously with the φHD.

First, at time t1, φHD becomes a high level. At time t1, readout of pixel signals from unit cells 101 in a given row starts.

Next, at time t2, φHD becomes a low level. Here, φBIAS_SH is a low level, and the gate electrode of the Pch transistor 133 and the gate electrode and the drain electrode of the Pch transistor 131 in the bias circuit 111 are conducting. In other words, a given voltage is being applied to the gate electrode of the Pch transistor 133.

Next, at time t3, φRS becomes a high level. The power supply voltage AVDD is applied to the FD unit 124, and the potential of the vertical signal line VL increases. The voltages of the FD units of other pixels connected to the same vertical signal line VL are held to the non-selection voltage PBIAS_L, and the amplifying transistor is off. When φBIAS_SH becomes a high level, the Pch transistor 132 is turned off. This causes the gate electrode of the Pch transistor 133 to have a high impedance state while holding the voltage value from the Pch transistor 131.

Next, at time t4, φRS becomes a low level. Here, generally, noise generated by switching of the reset transistor 122 causes a rapid variation in potential of the FD unit 124.

Next, in the period between time t4 and time t5, the FD unit becomes a high impedance state. Hence, a variation in the power supply voltage AVDD is transmitted to the FD unit 124 by capacitive coupling of the gate-to-drain capacitance Cgd. Moreover, the amplifying transistor 123 transmits the noise ΔVn to the vertical signal line VL according to the variation in potential of the FD unit 124. Here, in the bias circuit 111, the potential difference Vgs_P between the gate electrode and the source electrode of the Pch transistor 133 varies according to the ratio of the capacitance value Cvdd relative to the power supply voltage to the capacitance value Cgnd relative to the GND. The constant current Ip varies according to the variation in Vgs_P, varying the current Isf flowing through the constant current source transistor 127. Accordingly, the noise ΔVn generated in the unit cell 101 is cancelled, stabilizing the vertical signal line VL independently of the potential variation from the power supply voltage AVDD. During this period, data is held in the column readout circuit 106 as a reset level.

Next, at time t5, φTR becomes a high level, the transfer transistor 121 is turned on, and the signal charge from the light receiving unit 120 is transferred to the FD unit 124 (here, the potential of the FD unit 124 is reduced by the transfer of the signal charge of the light receiving unit 120 to the FD unit 124).

Next, at time t6, φTR is changed from a high level to a low level, and the transfer transistor 121 is turned off.

Next, in a similar manner to the period between time t4 and time t5, in the period between time t6 and time t7, the noise ΔVn generated in the unit cell 101 due to a variation in the power supply voltage AVDD is cancelled by the bias circuit 111. During this period, data is held in the column readout circuit 106 as a signal level, the difference between the reset level and the signal level is held as a pixel signal, and the pixel signal is converted from an analog signal to a digital signal for output.

Next, at time t7, φSW_L becomes a high level. Supply of the power supply voltage AVDD to the pixel power supply line VDDCELL is interrupted, causing the potential of the pixel power supply line VDDCELL to become the non-selection voltage PBIAS_L.

Next, at time t8, the reset transistor 122 is turned on when φRS becomes a high level, and the pixel non-selection voltage PBIAS_L of the pixel power supply line VDDCELL is applied to the FD unit.

Next, at time t9, φRS becomes a low level, causing the reset transistor 122 to turn off. Accordingly, the non-selection voltage PBIAS_L is applied to the FD unit, causing the amplifying transistor 123 to turn off.

Next, at time t10, φSW_L becomes a low level, causing the power supply voltage AVDD to be supplied to the pixel power supply line VDDCELL.

Next, at time t11, φHD becomes a high level again, and readout of pixel signals from the unit cells 101 in the next row starts. At times t11 to t20, the above operation (driving) is performed at the same timing of times t1 to t10.

As described above, in the solid-state imaging device 100 according to Embodiment 1, the bias circuit 111 varies the noise ΔVn generated in the vertical signal line VL connected to the unit cell 101 and the constant current Isf of the amplifying transistor 123, in accordance with the variation in the power supply voltage AVDD. Here, the ΔVn is noise caused by transmission of a variation in the power supply voltage AVDD to the FD unit 124 due to the influence from the parasitic capacitance Cgd present between the pixel power supply line VDDCELL and the FD unit 124. Accordingly, noise can be cancelled in a wide range of frequencies from low to high frequencies, independently of the frequency band of the vertical signal line VL.

Additionally, the amount of current supplied by the constant current source transistor can be adjusted according to the ratio of the capacitance value Cvdd to the capacitance value Cgnd, independently of the Vt values of the transistors. This allows noise caused by element variations to be cancelled accurately.

The optimal values of the capacitance value Cvdd and the capacitance value Cgnd can be set according to the driving mode by switching on and off the control SW.

In Embodiment 1, it may be that a plurality of transfer control lines TR are set to high levels to activate the unit cells 101. In this case, optimal noise cancelling effects can be selected by switching the control SW as necessary. In other words, the bias circuit 111 may change the ratio of the capacitance value of the first capacitor and the capacitance value of the second capacitor when the amplifying transistors 123 in different unit cells 101 are simultaneously activated.

Stated differently, in the solid-state imaging device, due to the influence from the parasitic capacitance Cgd present between the pixel power supply line VDDCELL and the FD unit in the unit cell, a variation in the power supply voltage AVDD is transmitted to the FD unit, causing the noise ΔVn in the vertical signal line VL. In contrast, in the solid-state imaging device 100 according to Embodiment 1, the bias circuit varies the constant current Isf of the amplifying transistor in accordance with the variation in the power supply voltage AVDD. Accordingly, power supply noise can be cancelled in a wide range of frequencies from low to high frequencies, independently of the frequency band of the vertical signal line VL.

Moreover, by causing the reference signal generating circuit to vary the RAMP output in accordance with the variation in the power supply voltage AVDD, the noise ΔVn generated in the vertical signal line VL due to the variation in the power supply AVDD can be cancelled using the common-mode rejection capability of the voltage comparing unit.

In Embodiment 1, for example, the same advantageous effects can be provided by any device structure such as a front-illuminated image sensor, a back-illuminated image sensor (solid-state imaging device) or an image sensor (solid-state imaging device) where a chip including an imaging region and a chip including a control unit are separately formed and these chips are stacked for electrical connection.

Embodiment 2

Hereinafter, referring to the drawings, differences in configuration and operation of the solid-state imaging devices between Embodiments 1 and 2 will be mainly described.

Figure 6:
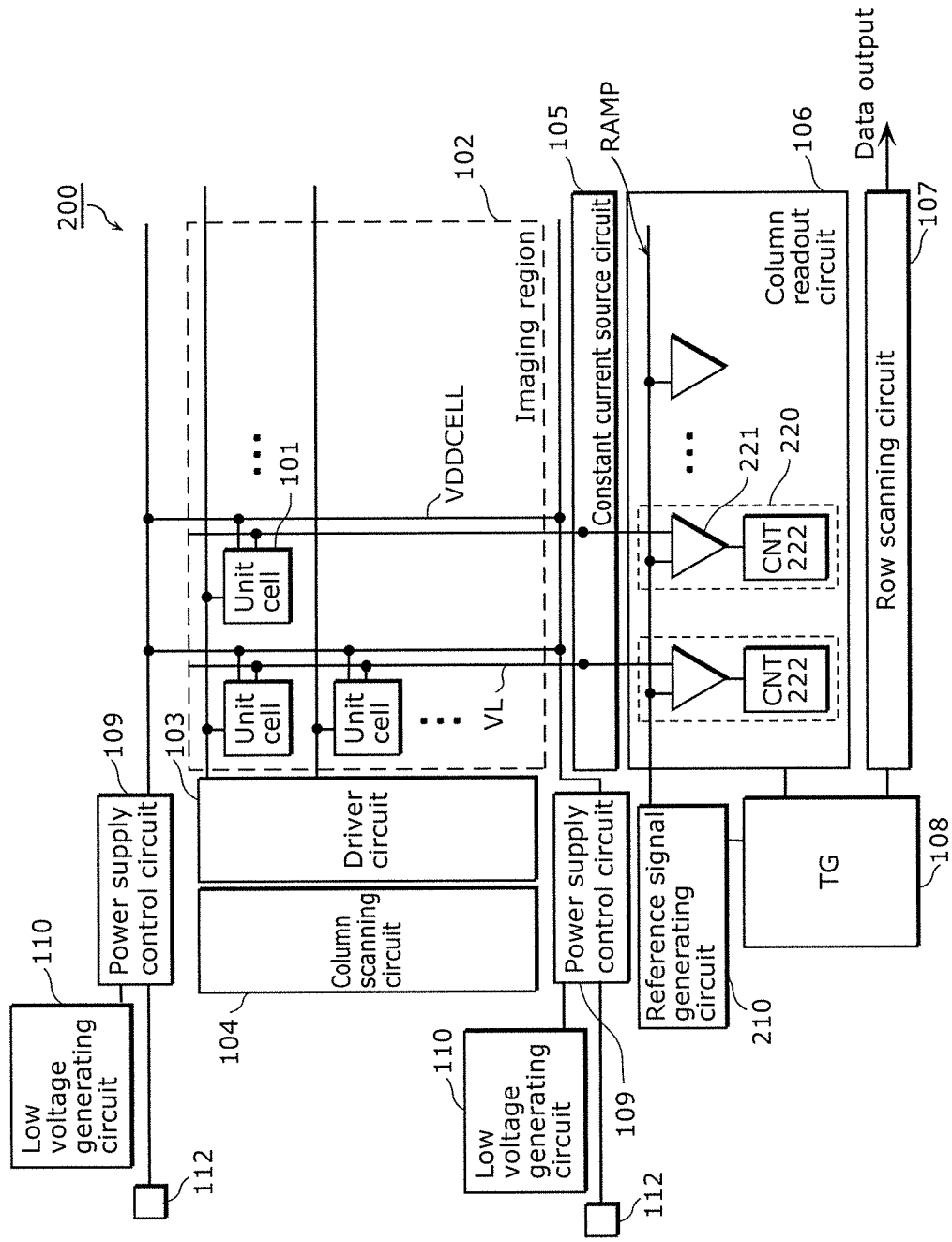
FIG. 6 is a block diagram of a solid-state imaging device according to Embodiment 2.

FIG. 6 is a block diagram of a configuration of the solid-state imaging device according to Embodiment 2. In FIG. 6, a solid-state imaging device 200 includes: an imaging region 102 including a plurality of unit cells 101 arranged in rows and columns; a driver circuit 103; a column scanning circuit 104; vertical signal lines VL; a constant current source circuit 105; a column readout circuit 106; a row scanning circuit 107; a TG 108; power supply control circuits 109; low voltage generating circuits 110; a PAD 112; and a reference signal generating circuit 210.

The column readout circuit 106 includes column AD circuit unit 220s. The column AD circuit units 220 each include: a voltage comparing unit 221 which receives pixel signals for one column and includes a difference unit; and a counter unit (CNT) 222. The column AD circuit unit 220 is an AD converting unit which compares the potential of the vertical signal line VL with a reference voltage output from the reference signal generating circuit 210, and converts an analog voltage which is the output signal into a digital voltage. The voltage comparing unit 221 is connected to the reference signal generating circuit 210 including a digital-to-analog converter (DAC) which supplies the reference voltage for AD conversion.

The voltage comparing unit 221 is connected to each column of the unit cells 101 arranged in rows and columns in the imaging region 102. In FIG. 6, the voltage comparing unit 221 is disposed for each column, but a voltage comparing unit may be disposed for a plurality of columns. The voltage comparing unit 221 performs CDS processing on the signal output, via the vertical signal line VL, from the unit cell 101 in the row selected by the column scanning circuit 104. With CDS processing, signal processing is performed for removing the reset noise generated in the unit cell 101 and fixed pattern noise specific to a pixel caused due to a variation in threshold of the transistors, and a processed pixel signal is temporarily held.

The column AD circuit unit 220 includes an AGC function and an analog-to-digital conversion function. The column AD circuit unit 220 converts the pixel signal, which is an analog signal, held in the CDS circuit into a digital signal.

Figure 7:
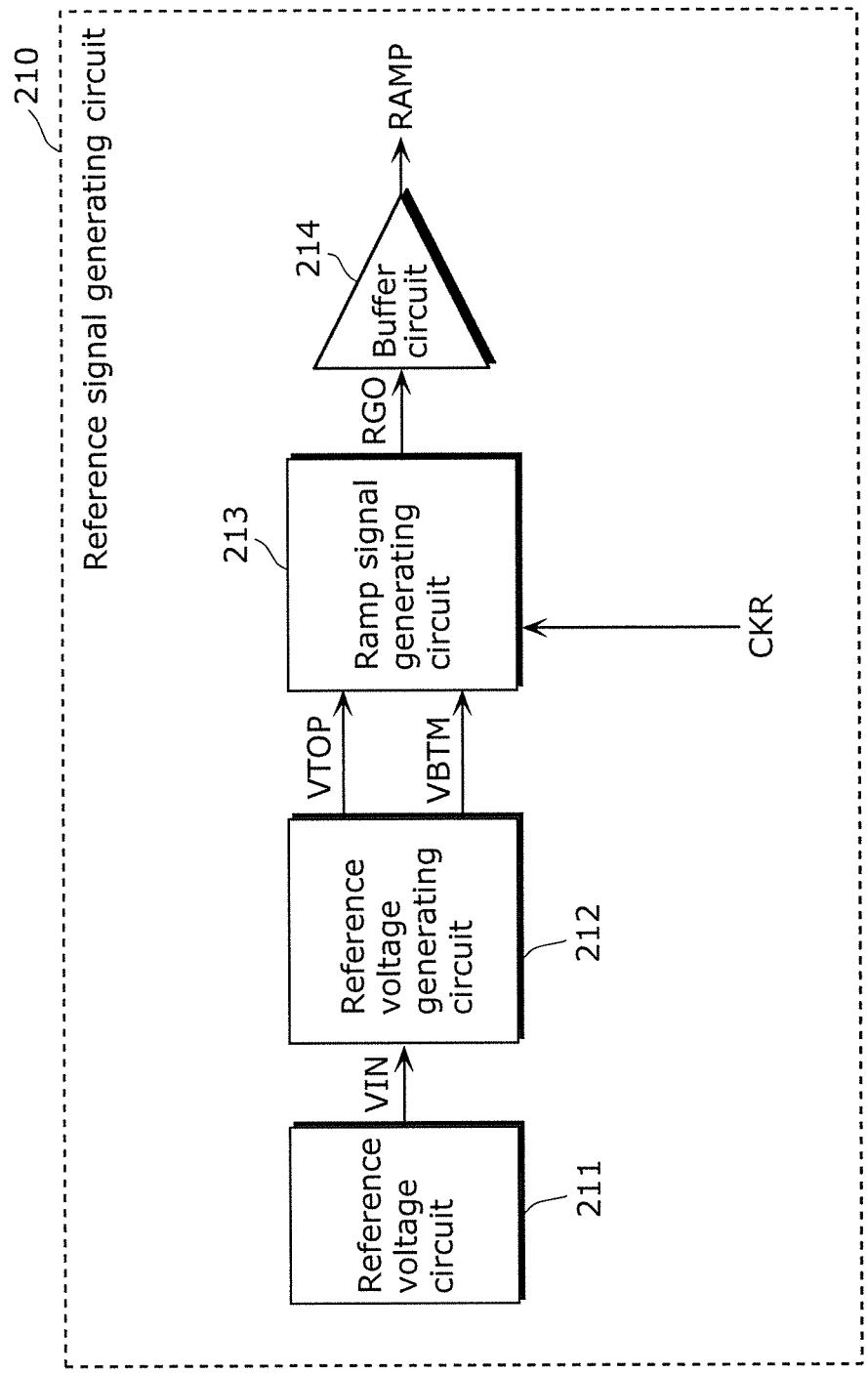
FIG. 7 illustrates an example of a configuration of a reference signal generating circuit according to Embodiment 2.

FIG. 7 illustrates an example of a configuration of the reference signal generating circuit according to Embodiment 2. The reference signal generating circuit 210 illustrated in FIG. 7 includes: a reference voltage circuit 211, a reference voltage generating circuit 212, a ramp signal generating circuit 213, and a buffer circuit 214. The reference signal generating circuit 210 generates a ramp signal which is a reference voltage which temporally varies based on the variation in the power supply voltage AVDD.

The reference voltage circuit 211 includes, for example, a general voltage source such as a BRG voltage source including a band-gap reference circuit. The reference voltage VIN output from the reference voltage circuit 211 is input to the reference voltage generating circuit 212.

The reference voltage generating circuit 212 outputs a ramp signal start voltage VTOP and a ramp signal end voltage VBTM. The ramp signal start voltage VTOP and the ramp signal end voltage VBTM are input to the ramp signal generating circuit 213.

The ramp signal generating circuit 213 outputs a ramp signal RGO to the buffer circuit 214. The buffer circuit 214 outputs a ramp waveform RAMP. On the other hand, a ramp generating clock CKR is input to the ramp signal generating circuit 213.

Figure 8:
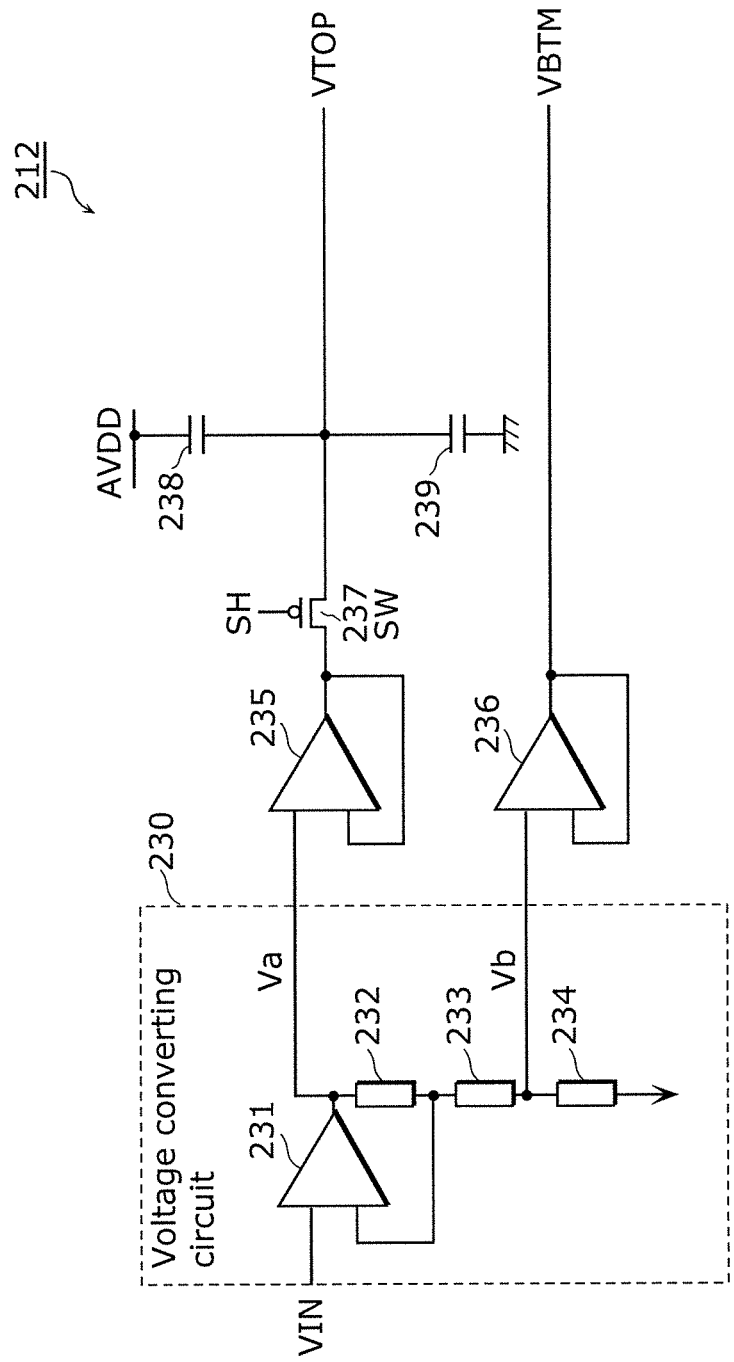
FIG. 8 illustrates an example of a configuration of a reference voltage generating circuit according to Embodiment 2.

FIG. 8 illustrates an example of a configuration of the reference voltage generating circuit according to Embodiment 2. The reference voltage generating circuit 212 illustrated in FIG. 8 includes: a voltage converting circuit 230; voltage buffers 235 and 236; a MOS switch 237; and capacitors 238 and 239. The voltage converting circuit 230 includes: a differential buffer 231; and resistors 232, 233, and 234.

The reference voltage VIN output from the reference voltage circuit 211 is input to a first input terminal of the differential buffer 231. The output terminal of the differential buffer 231 is connected to the GND via the resistors 232, 233, and 234 connected in series. The connection point between the resistors 232 and 233 are connected to a second input terminal of the differential buffer 231. The output terminal of the differential buffer 231 is connected to a first input terminal of the voltage buffer 235. The connection point between the resistors 233 and 234 is connected to a first input terminal of the voltage buffer 236. The output terminal of the voltage buffer 235 is connected to the input terminal side of the MOS switch 237. The output terminal side of the MOS switch 237 corresponds to the ramp signal start voltage VTOP. The output terminal side of the voltage buffer 236 corresponds to the ramp signal end voltage VBTM. A sample and hold signal SH is applied to the gate terminal of the MOS switch 237. The capacitor 238 is connected between the VTOP output terminal side of the MOS switch 237 and the pixel power supply voltage AVDD. The capacitor 239 is connected between the VTOP output terminal side of the MOS switch 237 and the GND.

Next, details of an operation of the solid-state imaging device 200 according to Embodiment 2 will be described, and details of an operation of the reference voltage generating circuit 212 will be described.

The voltage converting circuit 230 outputs voltages of two values of Va given by Equation 5 and Vb given by Equation 6, where R1 is a resistance value of the resistor 232, R2 is a resistance value of the resistor 233, R3 is a resistance value of the resistor 234, Va is an output voltage of the differential buffer 231, Vb is a voltage at the connection point between the resistor 233 and the resistor 234.

[Math. 5]

$$Va = (R1+R2+R3)/(R2+R3) \times VIN \quad \text{(Equation 5)}$$

$$Vb = R3/(R2+R3) \times VIN \quad \text{(Equation 6)}$$

In FIG. 8, when the resistors 232, 233, and 234 have variable resistance values, Vb can be varied without varying Va, allowing the amplitude of the ramp signal generating circuit 213 to be varied. Accordingly, the gain of the column AD circuit unit 220 can be varied. The voltage converting circuit 230 in FIG. 8 may be a type other than that in Embodiment 2 as long as voltages of two values are generated.

A MOS switch for cancelling offset may be connected in order to reduce the charge injection that occurs when the MOS switch 237 is turned off and a variation in potential of the gate electrode of the MOS switch 237 caused by coupling due to a variation in the control pulse φSH.

Descriptions of details of the operation of the solid-state imaging device 200 according to Embodiment 2 are continued below.

In the unit cell 101, when the reset control line RS is a high level, the reset control line RS becomes a low level and the transfer control line TR becomes a high level after the amplifying transistor 123 outputs a reset level to the vertical signal line VL, transferring the signal charge to the FD unit 124. While outputting the potential of the FD unit 124 as a signal level to the vertical signal line VL, a control pulse voltage φSH of low level is supplied as a sample and hold signal SH, causing the MOS switch 237 to turn off. When the control pulse voltage φSH is a low level, the voltage buffer 235 is electrically separated from the ramp signal start voltage VTOP. Here, it is assumed that Ca is the capacitance value of the capacitor 238, which is the third capacitor relative to the power supply voltage AVDD, and Cb is the capacitance value of the capacitor 239, which is the fourth capacitor relative to the GND. In this state, when the power supply voltage AVDD varies by the voltage variation ΔVdd, the ramp signal start voltage VTOP varies by a variation amount ΔVtop below.

[Math. 6]

$$\Delta V\text{top} = Ca/(Ca+Cb) \times \Delta V_{dd} \quad \text{(Equation 7)}$$

On the other hand, the ramp signal end voltage VBTM does not vary even if the power supply voltage AVDD varies by the voltage variation ΔVdd.

As FIG. 7 illustrates, the reference voltage generating circuit 212 outputs the ramp signal start voltage VTOP and the ramp signal end voltage VBTM as described above to the ramp signal generating circuit 213. The ramp signal generating circuit 213 is connected to a CKR terminal. In response to each CKR input, the ramp signal generating circuit 213 outputs a ramp signal RGO having a slope from the ramp signal start voltage VTOP to the ramp signal end voltage VBTM.

The buffer circuit 214 buffers the ramp signal RGO from the ramp signal generating circuit 213 so as to drive a plurality of voltage comparing units 221 included in the column AD circuit unit 220 connected to the output of the buffer circuit 214.

The ramp waveform RAMP output from the buffer circuit 214 is a voltage which depends on the ramp signal start voltage VTOP and the ramp signal end voltage VBTM. The voltage comparing unit 221 connected to the ramp waveform RAMP compares the voltage of the ramp waveform RAMP with the voltage of the vertical signal line VL.

Next, details of the operation of the solid-state imaging device 200 according to Embodiment 2 will be described referring to the timing chart in FIG. 9.

Figure 9:
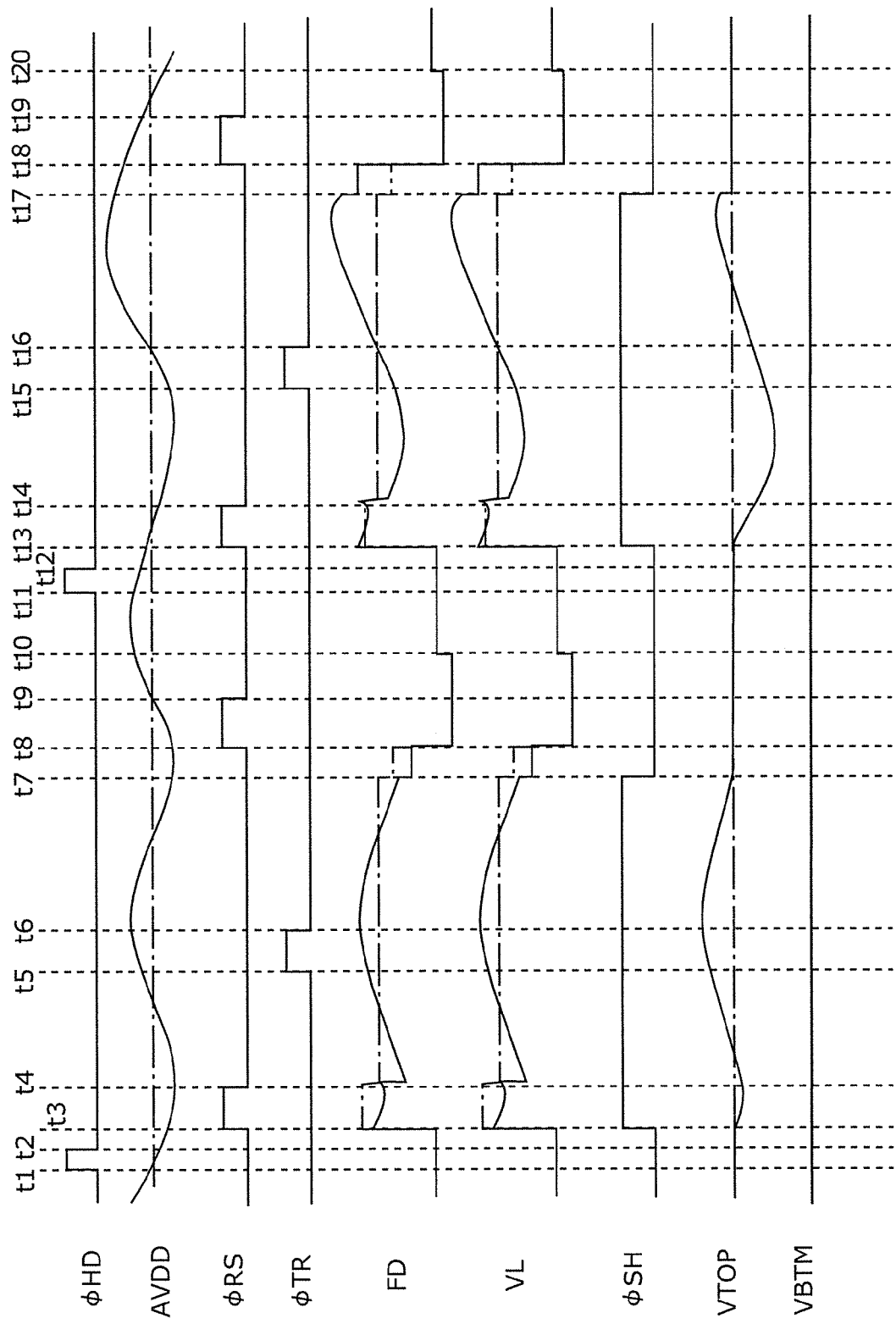
FIG. 9 is a timing chart for describing an operation of the solid-state imaging device according to Embodiment 2.

FIG. 9 is a timing chart for describing an operation of the solid-state imaging device according to Embodiment 2. In FIG. 9, solid-line waveforms indicate cases where the power supply voltage AVDD varies, and dot-and-dash line waveforms indicate cases where the power supply voltage AVDD does not vary. FIG. 9 illustrates a case where the power supply voltage AVDD varies asynchronously with φHD indicating the synchronization signal pulse for readout of pixel signals.

First, at time t1, φHD becomes a high level. At time t1, readout of pixel signals from the unit cells 101 in a given row starts.

Next, at time t2, φHD becomes a low level. Here, φSH is a low level, and the output of the voltage buffer 235 and the VTOP terminal in the reference voltage generating circuit 212 are conducting, and a given voltage is being applied to the VTOP terminal.

Next, at time t3, φRS becomes a high level. The power supply voltage AVDD is applied to the FD unit 124, and the potential of the vertical signal line VL increases. Although not illustrated in FIG. 9, the voltages of the FD units of other pixels connected to the same vertical signal line VL are held to the non-selection voltage PBIAS_L, and the amplifying transistors are off. The MOS switch 237 is turned off when φSH becomes a high level, and the VTOP terminal becomes a high impedance state.

Next, at time t4, φRS becomes a low level. Here, generally, noise generated by switching of the reset transistor 122 causes a potential difference in the FD unit 124.

Next, in the period between time t4 and time t5, the FD unit becomes a high impedance state. Hence, a variation in the power supply voltage AVDD is transmitted to the FD unit 124 by capacitive coupling of the gate-to-drain capacitance Cgd. Moreover, the amplifying transistor 123 transmits the noise ΔVn to the vertical signal line VL according to the variation in potential of the FD unit 124. Here, the ramp signal start voltage VTOP of the reference voltage generating circuit 212 varies by the ΔVtop, according to the ratio of the capacitance value Ca relative to the power supply voltage to the capacitance value Cb relative to the GND. In other words, the reference voltage defined by the ramp signal start voltage VTOP and the ramp signal end voltage VBTM corresponds to a differential voltage, between the power supply voltage AVDD and the ground potential, varying at the ratio of the capacitance value of the capacitor 238 to the capacitance value of the capacitor 239. The vertical signal line VL is connected to a first input terminal of the voltage comparing unit 221 of the column AD circuit unit 220, and the power supply noise of the ΔVn is transmitted. Moreover, the ramp waveform RAMP is input to a second input terminal of the voltage comparing unit 221, and the power supply noise of the ΔVtop is transmitted. The power supply noise can be cancelled using the common-mode rejection capability of the voltage comparing unit 221, by determining the capacitance values of the capacitor 238 and the capacitor 239 of the reference voltage generating circuit 212 such that the ΔVn is approximately equal to the ΔVtop. Accordingly, the noise ΔVn generated in the unit cell 101 is cancelled, stabilizing the output of the voltage comparing unit 221 independently of the potential variation from the power supply voltage AVDD. During this period, the counter unit 222 outputs the AD conversion result which is not influenced by the pixel power supply noise.

Next, at time t5, φTR becomes a high level, the transfer transistor 121 is turned on, and the signal charge is transferred to the FD unit 124 from the light receiving unit 120. Here, although not illustrated in FIG. 9, the potential of the FD unit 124 is reduced by the transfer of the signal charge from the light receiving unit 120 to the FD unit 124.

Next, at time t6, φTR is changed from a high level to a low level, and the transfer transistor 121 is turned off.

Next, in a similar manner to the period between time t4 and time t5, in the period between time t6 and time t7, the noise ΔVn generated in the unit cell 101 due to a variation in the power supply voltage AVDD is cancelled by the ΔVtop of the reference voltage generating circuit 212. During this period, the data is held in the column readout circuit 106 as a signal level, the difference between the reset level and the signal level is held as a pixel signal, and the pixel signal is converted from an analog signal to a digital signal for output.

Next, at time t8, φRS becomes a high level, causing the reset transistor 122 to turn on and causing the pixel non-selection voltage PBIAS_L of the pixel power supply line VDDCELL to be applied to the FD unit.

Next, at time t9, φRS becomes a low level, turning off the reset transistor 122. With this, the non-selection voltage PBIAS_L is applied to the FD unit, and the amplifying transistor 123 is turned off.

Next, at time t11, φHD becomes a high level again, and readout of pixel signals from the unit cells 101 in the next row starts. The operations (driving) same as those performed at times t1 to t10 are performed at times t11 to t20.

As described above, according to Embodiment 2, due to the influence from the parasitic capacitance Cgd present between the pixel power supply line VDDCELL and the FD unit 124 in the unit cell 101, a variation in the power supply voltage AVDD is transmitted to the FD unit 124, generating noise ΔVn in the vertical signal line VL. The reference signal generating circuit 210 also varies the ramp signal start voltage VTOP in accordance with the variation in the power supply voltage AVDD. With such a configuration, by varying the ramp signal start voltage VTOP according to the noise ΔVn caused due to the variation in the power supply voltage AVDD, the comparison result of the voltage comparing unit 221 can be made independent of the power supply voltage AVDD. Accordingly, noise can be cancelled in a wide range of frequencies from low to high frequencies, independently of the frequency band of the vertical signal line VL.

Moreover, the ramp signal start voltage VTOP can be varied in accordance with the variation in the power supply voltage AVDD at the ratio of the capacitance value Ca and the capacitance value Cb, independently of the Vt values of the transistors. Accordingly, noise caused by the element variations can be cancelled accurately.

Moreover, in Embodiment 2, the MOS switch 237 is turned off to have a high impedance state during the pixel signal readout period. Hence, noise can be cancelled in a wide range of frequencies from low to high frequencies of variation in the power supply voltage AVDD.

Even if the MOS switch 237 is not included in the circuit, the noise ΔVtop generated in the unit cell 101 can be generated from the power supply noise ΔVdd. In this case, since the VTOP terminal and the output terminal of the voltage buffer 235 are connected, if the frequency of the variation in the power supply voltage AVDD is in the low frequency range, the VTOP terminal is fixed to a given voltage by the voltage buffer 235 while having a low impedance state. Hence, when the MOS switch 237 is not included, noise can be cancelled in the low frequency range of the power supply voltage AVDD as well, by setting the voltage buffer 235 to have a high output impedance, or increasing the absolute values of the capacitance values of the capacitors 238 and 239.

Embodiment 2 has described a case where, in the output of the unit cell 101, the potential of the vertical signal line VL after the reset by the reset transistor 122 is higher than that of the vertical signal line VL after the transfer of signal charge by the transfer transistor 121.

In contrast, a case may also be possible where in the output of the unit cell 101, the potential of the VL after reset by the reset transistor 122 is lower than that of the VL after the transfer of the signal charge by the transfer transistor 121. In such a case, the MOS switch 237 is connected between the output terminal of the voltage buffer 236 and the VBTM terminal of the ramp signal generating circuit 213. The second input terminal of the voltage buffer 236 is connected to the output terminal of the voltage buffer 236. An SH signal is supplied to the gate terminal of the MOS switch 237. The capacitor 238 is connected between the VBTM output terminal side of the MOS switch 237 and the pixel power supply voltage AVDD. The capacitor 239 is connected between the VBTM output terminal side of the MOS switch 237 and the GND. Such a configuration provides the same advantageous effects.

Embodiment 3

Hereinafter, referring to the drawings, differences in configuration and operation of the solid-state imaging devices between Embodiment 3 and the above described embodiments will be mainly described.

Figure 10:
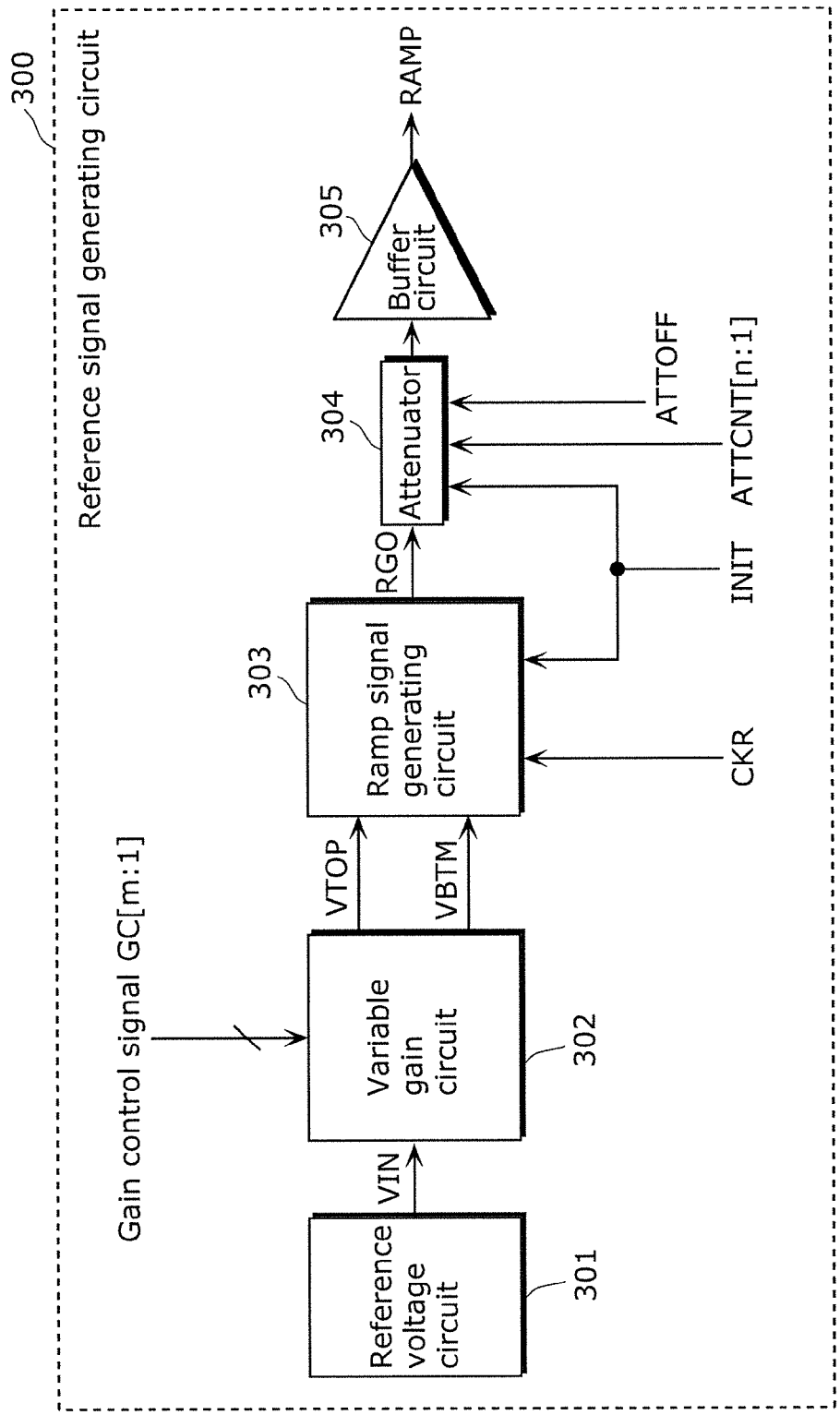
FIG. 10 illustrates an example of a configuration of a reference signal generating circuit according to Embodiment 3.

FIG. 10 illustrates an example of a configuration of a reference signal generating circuit according to Embodiment 3. A reference signal generating circuit 300 illustrated in FIG. 10 includes: a reference voltage circuit 301; a variable gain circuit 302; a ramp signal generating circuit 303; an attenuator 304; and a buffer circuit 305.

The reference voltage circuit 301 outputs a reference voltage VIN to the variable gain circuit 302. The variable gain circuit 302 outputs a ramp signal start voltage VTOP and a ramp signal end voltage VBTM to the ramp signal generating circuit 303. The ramp signal generating circuit 303 outputs a ramp signal RGO to the attenuator 304. The output of the attenuator 304 is input to the buffer circuit 305, and the buffer circuit 305 outputs a ramp waveform RAMP. A ramp generating clock CKR and a control signal INIT are input to the ramp signal generating circuit 303. The control signal INIT, a control signal ATTOFF, and a control signal ATTCNT[n:1] are input to the attenuator 304. A gain control signal GC[m:1] is input to the variable gain circuit 302.

The variable gain circuit 302 controls the reference voltage VIN output from the reference voltage circuit 301 based on the set value of the gain control signal GC[m:1], and performs variable control on the ramp signal start voltage VTOP and the ramp signal end voltage VBTM for output.

The ramp signal generating circuit 303 sets the ramp signal RGO to a predetermined offset voltage according to the control signal INIT. Subsequently, the ramp signal generating circuit 303 outputs a ramp signal RGO which transits to the ramp signal start voltage VTOP after the start of input of the ramp generating clock CKR and then transits to the ramp signal end voltage VBTM from the ramp signal start voltage VTOP.

When the control signal ATTOFF is set as invalid, the attenuator 304 attenuates the amplitude of the ramp signal RGO at a predetermined rate so that the amplitude of the ramp signal RGO matches the input range of the AD conversion. When the control signal ATTOFF is set as valid, the attenuator 304 is capable of directly performing an adjustment so that the amplitudes of the ramp signal start voltage VTOP and the ramp signal end voltage VBTM match the input range of the AD conversion, without attenuating the amplitude of the ramp signal RGO. By this adjustment, the following two measures against power supply noise can be selectively used for the power supply which includes power supply noise superimposed on the pixel source follower output signal. In the first measure, a common-mode power supply noise is superimposed on the output signal of the reference signal generating circuit 300 by adding a coupling capacitance to Embodiment 2. In the second measure, a common-mode power supply noise is superimposed on the output signal of the reference signal generating circuit 300 by using the coupling capacitance in the attenuator 304.

When the control signal ATTOFF is set as invalid, the attenuator 304 increases the amplitude of the ramp signal RGO to be greater than the amplitude that is actually necessary. As a result, the circuit noise superimposed on the signal path in the prior stage of the attenuator 304 is attenuated. This reduces part of the noise voltage to be equal to or less than the quantization noise, resulting in an increase in signal-to-noise ratio of the ramp signal.

The buffer circuit 305 buffers the output signal of the attenuator 304 so that a plurality of comparator loads connected in parallel to the output of the buffer circuit 305 are driven. The buffer circuit 305 converts a voltage signal at the voltage division point between the fifth capacitor and the sixth capacitor into a voltage signal having a low impedance, and outputs the low-impedance voltage signal.

Details of the attenuator 304 included in the solid-state imaging device according to Embodiment 3 will be described. In Embodiment 3, the attenuator 304 has one of the following three configurations.

Figure 11:
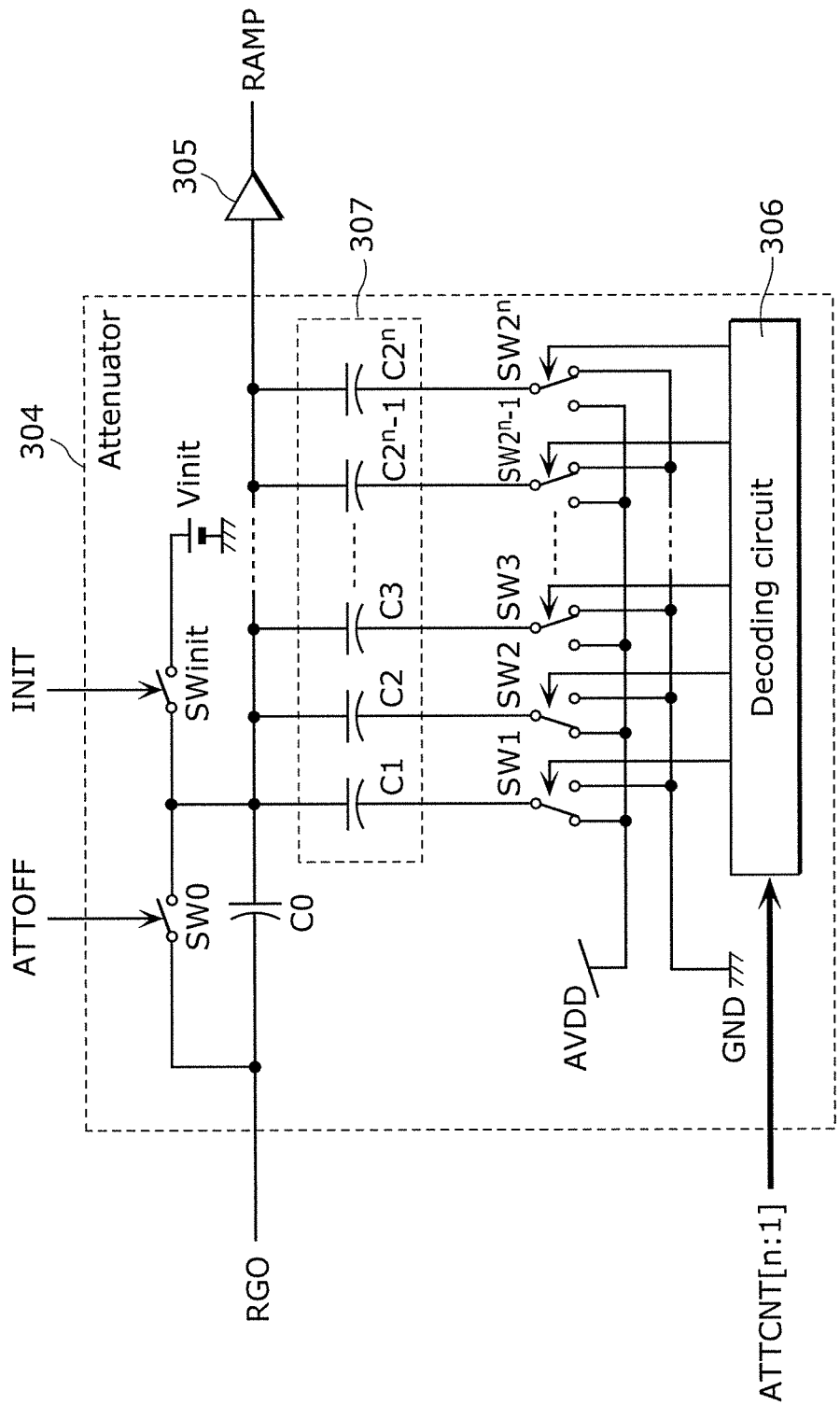
FIG. 11 illustrates a first example of a configuration of an attenuator according to Embodiment 3.

FIG. 11 illustrates a first example of a configuration of the attenuator according to Embodiment 3. In the following description, it is assumed that the control signal ATTOFF is set as invalid, in order to describe the attenuation operation.

The attenuator 304 illustrated in FIG. 11 includes a decoding circuit 306 and a ground capacitor 307. The ramp signal RGO is input to a first terminal of a capacitor C0 which is a fifth capacitor. A second terminal of the capacitor C0 is connected to the buffer circuit 305. A switch SW0 is a first switch which connects the ramp signal RGO input terminal and the second terminal of the capacitor C0 when the switch SW0 is closed. The second terminal of the capacitor C0 is connected to first terminals of a plurality of capacitors C1 to C2$^n$ which are sixth capacitors. Second terminals of the capacitors C1 to C2$^n$ are connected to switches SW1 to SW2$^n$ in a one-to-one correspondence. The switches SW1 to SW2$^n$ are switches which switch the voltages of the second terminals of the capacitors C1 to C2$^n$ between the ground potential GND and the power supply voltage AVDD. The switches SW1 to SW2$^n$ are controlled by the decoding circuit 306. The control signal ATTCNT[n:1] is input to the decoding circuit 306. A switch SWinit is connected between the second terminal of the capacitor C0 and the bias voltage Vinit terminal.

The output of the attenuator 304 (input of the buffer circuit 305) is positioned at the voltage division point between the capacitors C0 to C2$^n$ connected between the ramp signal RGO and the power supply or the ground. The attenuator 304 attenuates the AC component of the ramp signal RGO at a predetermined attenuation ratio. The output of the attenuator 304 (input of the buffer circuit 305) has a high impedance. Hence, before the start of output of the ramp signal RGO, the initial potential needs to be set by a DC bias voltage. Here, before the ramp generating clock CKR is input, the Swinit is closed by the control signal INIT, and the output voltage of the attenuator 304 is initialized to the bias voltage Vinit. As FIG. 10 illustrates, the control signal INIT is also input to the ramp signal generating circuit 303. Accordingly, as described above, the ramp signal RGO is set to a predetermined offset voltage. Before the start of output of the ramp signal, the capacitor C0 is charged with the difference voltage between the offset voltage of the ramp signal RGO and the bias voltage Vinit. Subsequently, when input of the ramp generating clock CKR starts, the ramp signal RGO is transited to the ramp signal start voltage VTOP. After initializing the output logic of the comparators in the subsequent stage, the ramp signal generating circuit 303 outputs the ramp signal RGO having a slop reaching the ramp signal end voltage VBTM at a predetermined clock frequency. The signal obtained by attenuating the amplitude of the RGO at a predetermined rate by the attenuator 304 is output to the comparators via the buffer circuit 305. Each comparator compares the pixel source follower output signal with the reference signal, and performs a series of AD conversion operation.

Next, advantageous effects provided by the above configuration will be described. In FIG. 11, assuming that the value set to the control signal ATTCNT[n:1] is k (decimal), the decoding circuit 306 performs thermometer-decoding processing, and generates a control signal which connects, out of 2$^n$ switches SW1 to SW2$^n$, SW1 to SW2$^k$ to the power supply side, and switches SW (2$^k$+1) to SW2$^n$ to the ground side. For example, FIG. 11 illustrates a case where k=1, and the SW1 and SW2 are connect to the power supply side, and the SW3 to SW2$^n$ are connected to the ground side.

As described above, the gain of the power supply noise superimposed on the output of the attenuator 304 can be adjusted by controlling, relative to the capacitors included in the ground capacitor 307, the ratio of the capacitance values of the capacitors connected to the power supply to the capacitance values of the capacitors connected to the ground by the set value of the ATTCNT[n:1] that is a first control signal.

Accordingly, a combination of the capacitance value of each capacitor of the ground capacitor 307 and the control of ATTCNT[n:1] is arbitrarily designed so that the gain of the power supply noise superimposed on the vertical signal line VL connected to the unit cell 101 is approximately the same as the gain of the power supply noise superimposed on the output of the attenuator 304. Accordingly, PSRR which is a power supply resistance of the output can be improved by using the common-mode noise rejection effect of the differential input circuit of the comparator in the subsequent stage.

Here, the capacitors connected to the power supply and the capacitors connected to the ground are arbitrarily changed according to the set value of the ATTCNT[n:1]. However, since the attenuator 304 attenuates only the AC components, the attenuation ratio does not vary according to the difference in ground potential. Accordingly, the gain of the power supply noise superimposed on the output of the attenuator 304 can be adjusted while maintaining the amplitude and the slope of the output of the reference signal generating circuit 300 constant.

Figure 12:
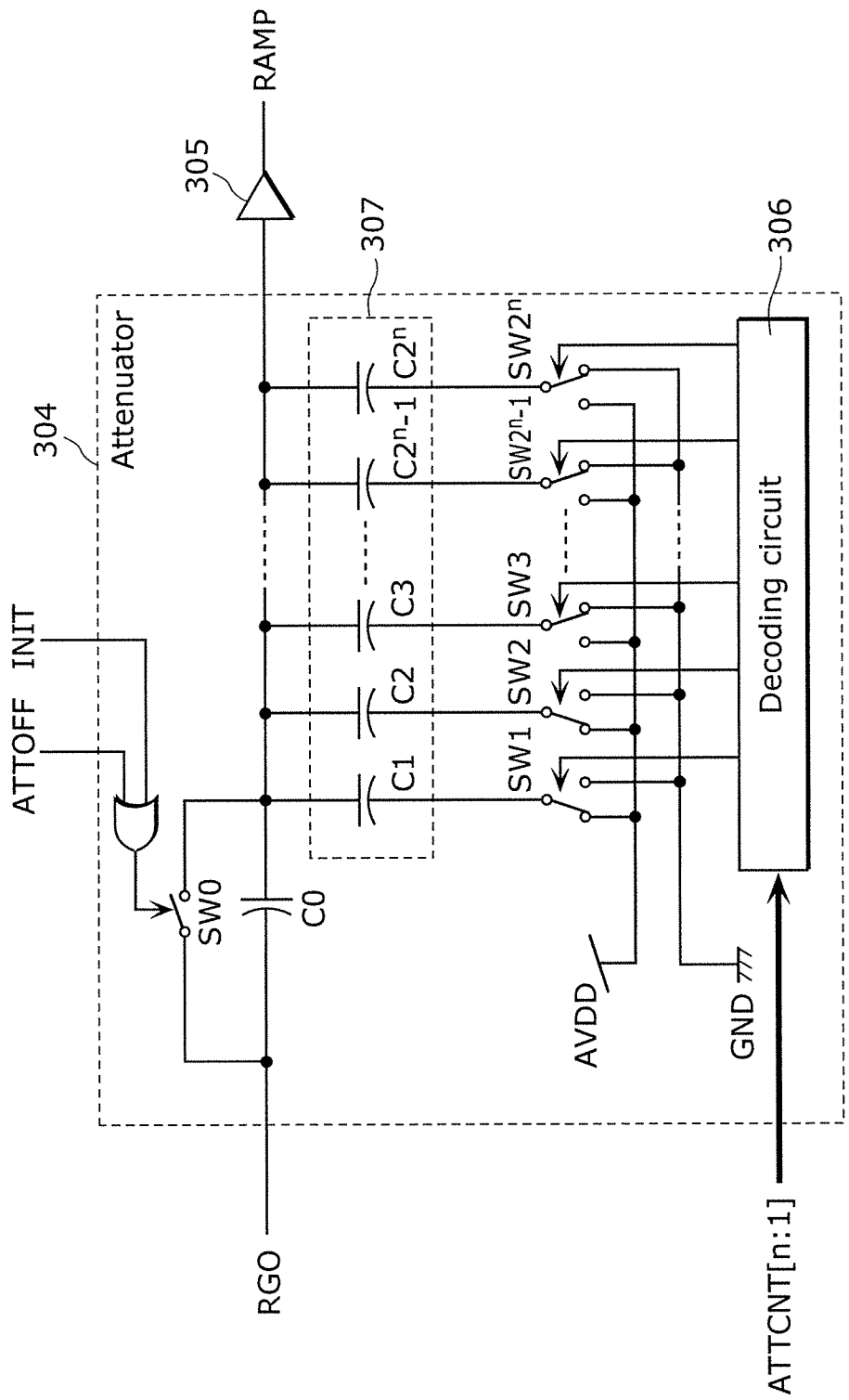
FIG. 12 illustrates a second example of the configuration of the attenuator according to Embodiment 3.

FIG. 12 illustrates a second example of the configuration of the attenuator according to Embodiment 3. In the first example illustrated in FIG. 11, in the initial state of the attenuator 304 before the start of the output of the ramp signal, the capacitor C0 is charged with the difference voltage between the offset voltage of the ramp signal RGO and the bias voltage Vinit. However, the amount of charge in the capacitor C0 does not contribute to the operation. Hence, how to charge the capacitor C0 may be any other method as long as the DC potential of the output signal of the attenuator 304 is set. In the second example illustrated in FIG. 12, the SW0 which short-circuits the terminals across the capacitor C0 is controlled by the logic sum of a control signal ATTOFF, which is the third control signal, and the INIT. Accordingly, the offset voltage of the ramp signal RGO can be used as the DC potential of the output signal of the attenuator 304. This eliminates the need for a circuit which generates the bias voltage Vinit.

Additionally, in the configurations illustrated in FIG. 11 and FIG. 12, the number of the switched capacitors of the ground capacitor 307 is $2^n$, which facilitates control.

Figure 13:
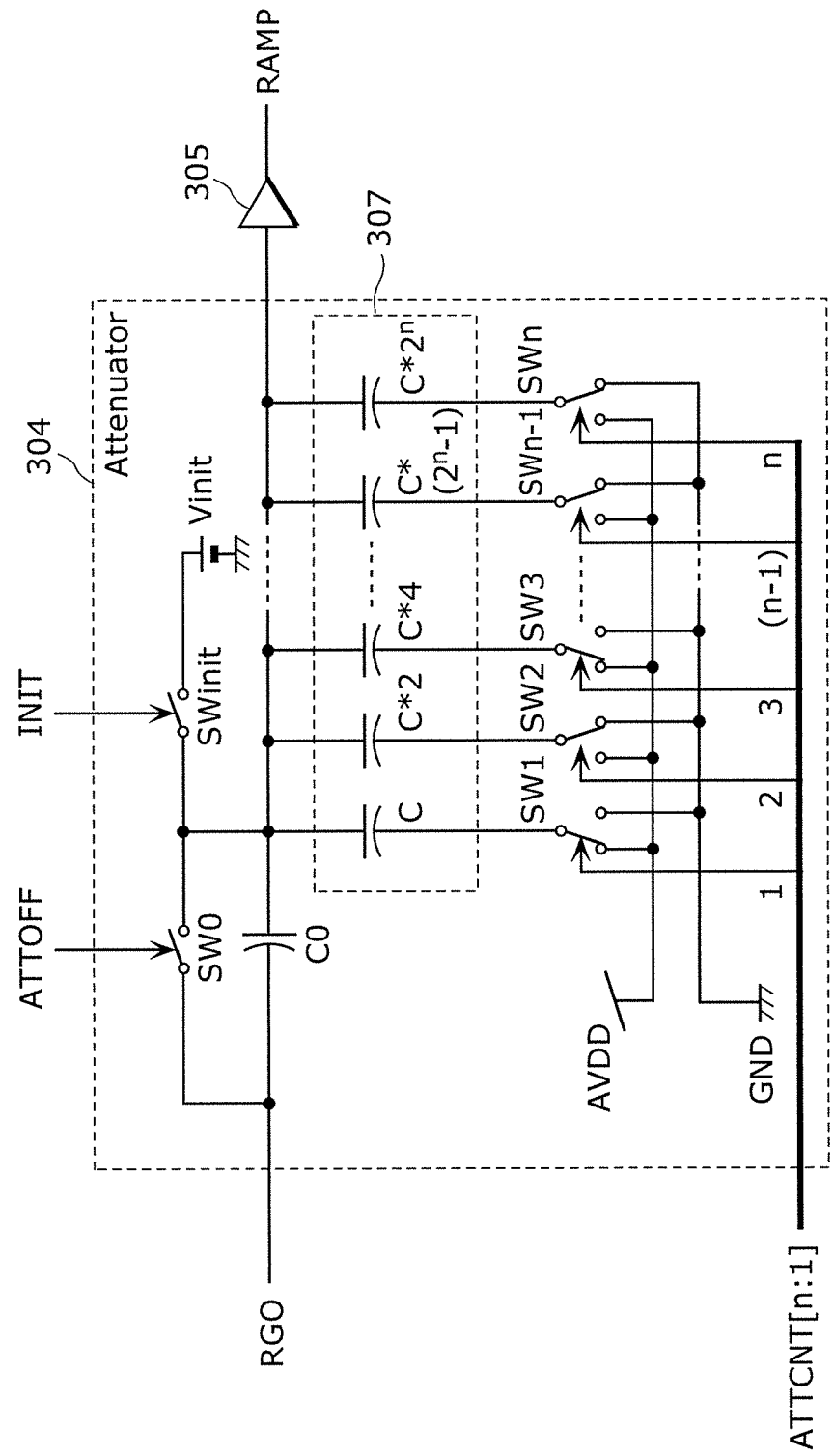
FIG. 13 illustrates a third example of the configuration of the attenuator according to Embodiment 3.

FIG. 13 illustrates a third example of the configuration of the attenuator according to Embodiment 3. In FIG. 13, the decoding circuit 306 is not used. The switched capacitors included in the ground capacitor 307 are set to have, for example, weighted capacitance values increasing by powers of 2 relative to a unit capacitor C. The switches for respective capacitors are assigned to bits of the control signal ATTCNT[n:1] in a one-to-one correspondence for control. With such a configuration, while the gain control of the power supply noise transmitted to the output of the attenuator 304 achieves the number of combinations of the switched capacitors and the switches approximately the same as those in FIG. 11 and FIG. 12, the number of switches for the switched capacitors can be reduced from $2^n$ to n.

In Embodiment 3, the minimum switching resolution for switching the switched capacitors of the ground capacitor 307 to the power supply side and to the ground side is uniformly the unit capacitor C. However, a plurality of switches are switched simultaneously by the binary control of the ATTCNT[n:1]. Hence, the switching resolution need not be uniform as long as the sum of the capacitance values of the switched capacitors is a desired capacitance value.

In practice, when a different gain in which power supply noise is superimposed is used according to the frequency band in which the power supply noise is suppressed, if the switching resolution is uniform, setting to the optimal point may fail. Accordingly, weights of the switched capacitors of the ground capacitor 307 are not limited to powers of two. Any irregular given weights according to a desired gain setting can also provide similar advantageous effects.

Embodiment 4

Hereinafter, referring to the drawings, differences in configuration and operation of the solid-state imaging devices between Embodiment 4 and the above described embodiments will be mainly described.

Figure 14:
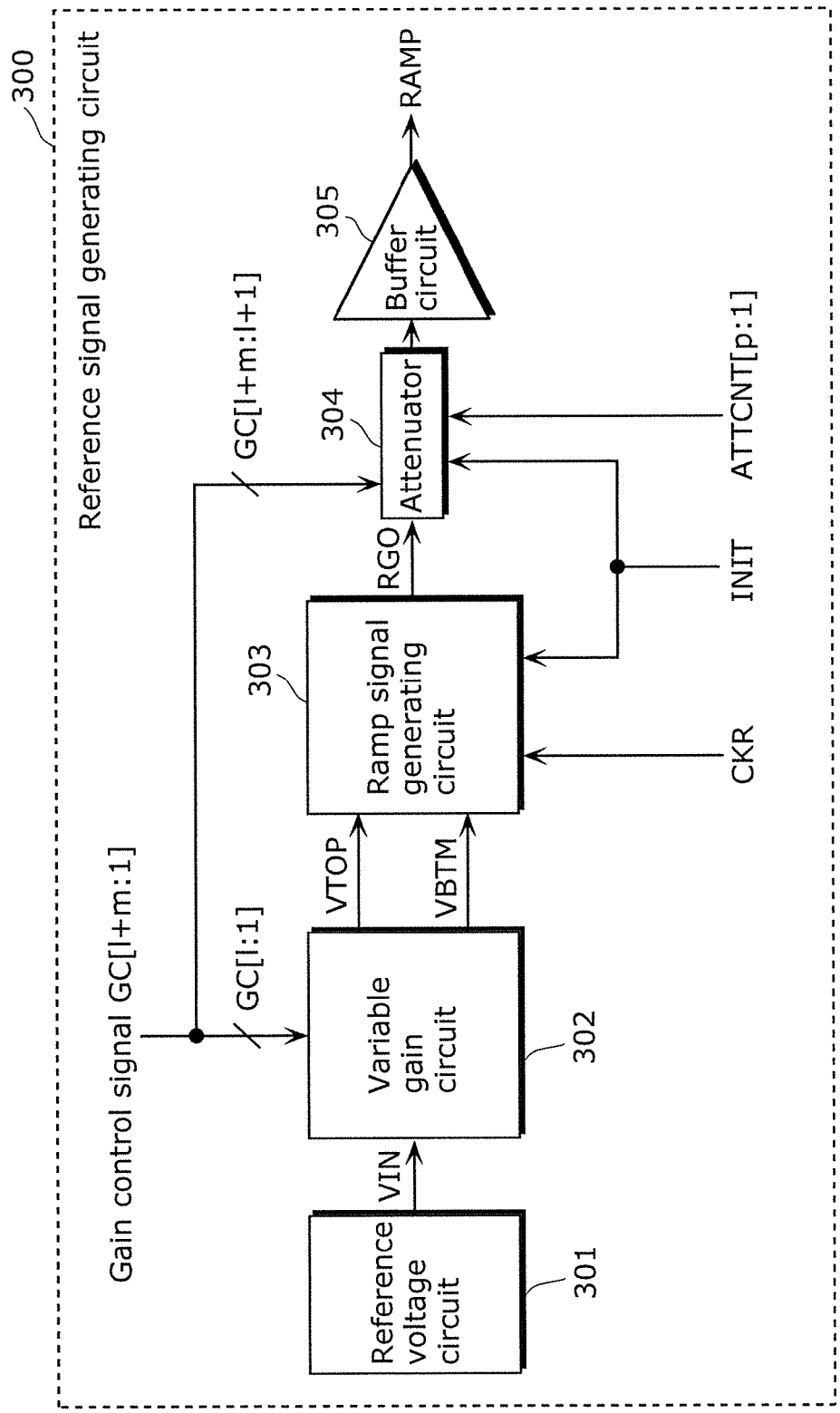
FIG. 14 illustrates an example of a configuration of a reference signal generating circuit according to Embodiment 4.

FIG. 14 illustrates an example of a configuration of a reference signal generating circuit according to Embodiment 4. The reference signal generating circuit according to Embodiment 4 is different from that in Embodiment 3 in that the gain control signal GC is also connected to the attenuator 304 so that the variable gain function is shared between the variable gain circuit 302 and the attenuator 304.

The attenuation function of the attenuator 304 according to Embodiment 3 suppresses noise caused in the circuits in the prior stages. In Embodiment 4, the suppression can be further increased by varying the attenuation rate of the attenuator so as to increase the attenuation when the output amplitude of the reference signal generating circuit 300 is small (when the gain is high).

Moreover, in the above embodiments, all the gain range is controlled by the ramp signal start voltage VTOP and the ramp signal end voltage VBTM of the variable gain circuit 302. In contrast, in Embodiment 4, as FIG. 14 illustrates, a gain can be varied by control of the ramp signal start voltage VTOP and the ramp signal end voltage VBTM by lower l-bits of the gain control signal and the variable control of the attenuation ratio by the upper m-bits of the gain control signal.

As distribution of the gain control range of the upper bits and the lower bits of the gain control signal, for example, it is assumed that the lower bits control 0 to 6 dB range and the upper bits control 6 dB step. In this case, capacitors are switched such that the difference voltage between the ramp signal start voltage VTOP and the ramp signal end voltage VBTM is varied in the range of 1/2 to 1 times by the control of the lower bits and the attenuation ratio is varied to 1/2 times by an increase of one code of the upper bits.

Figure 15:
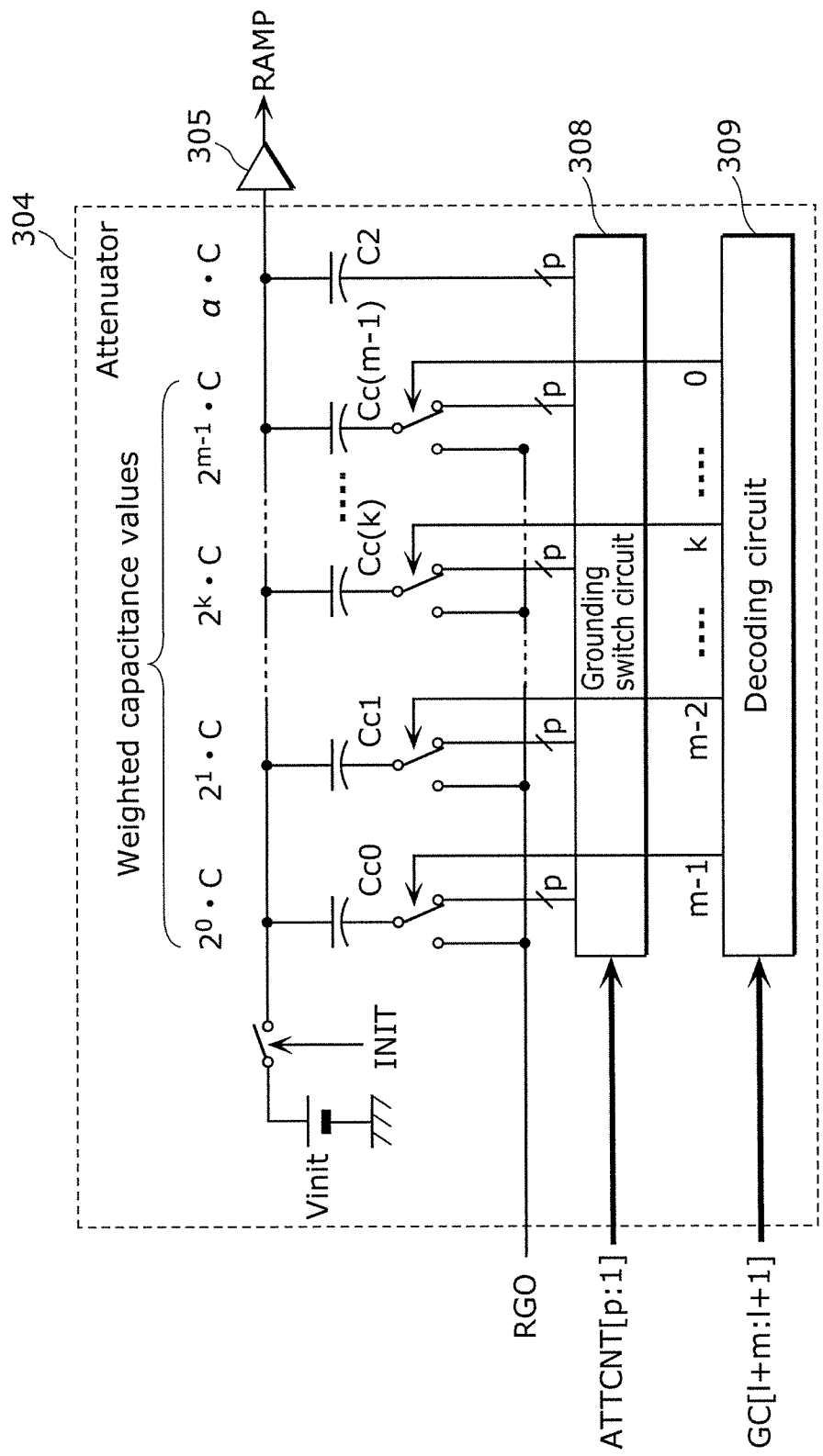
FIG. 15 illustrates an example of a configuration of an attenuator according to Embodiment 4.

FIG. 15 illustrates an example of a configuration of an attenuator according to Embodiment 4. In Embodiment 4, the attenuation function is essential for the operation. Hence, the function of the control signal ATTOFF is not used. The attenuator 304 illustrated in FIG. 15 includes a grounding switch circuit 308 and the decoding circuit 309. The variable gain capacitors Cc0 to Cc(m−1) are set to have weighted values increasing by powers of 2 relative to a unit capacitor C, and have first terminals commonly connected serving as the output terminal of the attenuator 304 (input of the buffer circuit 305). The capacitor C2 is a fixed capacitor determining the maximum value of the attenuation ratio. The capacitor C2 has a given weighted value (α in FIG. 15) relative to the unit capacitor C.

The upper m-bits of the gain control signal GC are converted to m thermometer-decoded signals by the decoding circuit 309, and connects respective switches connected to second terminals of variable gain capacitors Cc0 to Cc(m−1) to the ramp signal RGO side or the grounding switch circuit 308 side. The switches for the variable gain capacitors Cc0 to Cc(m−1) are assigned to the bits of the thermometer decoded signals in a one-to-one correspondence in such a manner that as the bits move from the least significant bit (LSB) to the upper bits, the weights of the variable gain capacitors Cc0 to Cc(m−1) increases. For example, when the value of the gain control signal GC is 0, respective switches for the variable gain capacitors Cc0 to Cc(m−1) are connected to the ramp signal RGO side. Here, when the value of the gain control signal is 1, the switch for the Cc(m−1) controlled by the LSB of the temperature decoding signals is connected to the grounding switch circuit 308 side, changing the attenuation ratio to 1/2. Subsequently, the attenuation ratio increases by powers of 2 according to the values of the upper m-bits of the gain control signal in a similar manner, and thus, the attenuation ratio functions as a 6 dB step variable gain. The above attenuation ratio is given by the following Equation 8.

[Math. 7]

$$\text{Attenuation ratio } A(x) = \frac{\sum_{k=0}^{m-1-x} (2^k \cdot C)}{\alpha \cdot C + \sum_{k=0}^{m-1} (2^k \cdot C)} \quad \text{(Equation 8)}$$

$$(x = 0 \sim m - 1)$$

Here, x in the above equation 8 indicates the bit of the temperature decoding signal. The value of the denominator is constant regardless of the value of x, and the numerator increases or decreases by multiples of two.

Figure 16:
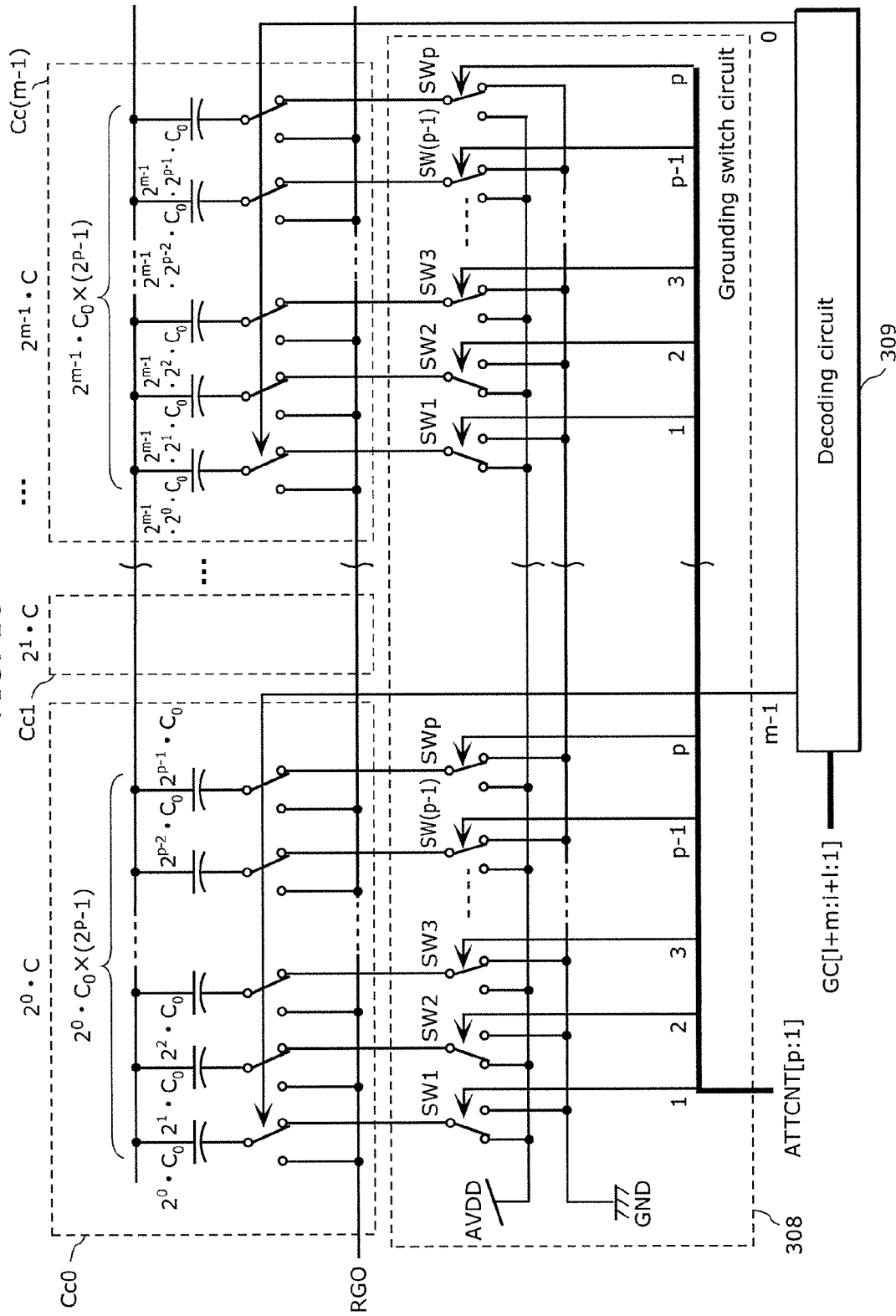
FIG. 16 illustrates an example of a configuration of a grounding switch circuit according to Embodiment 4.

FIG. 16 illustrates an example of a configuration of a grounding switch circuit according to Embodiment 4. The grounding switch circuit 308 includes a plurality of switches SW1 to SWp which connect second terminals of the variable gain capacitors Cc0 to Cc(m−1) to the ground or the power supply voltage AVDD. FIG. 16 illustrates details of the connection relationship between weights of a basic unit capacitor $C_0$ and the control signal ATTCNT[p:1], relative to the unit capacitor C of the variable gain capacitors in FIG. 15. The unit capacitor C of the weighted capacitors in FIG. 15 includes ($2^P−1$) basic unit capacitors $C_0$, and is divided into p capacitors with weights increasing by powers of 2 in FIG. 16.

FIG. 16 does not illustrate the configuration of the capacitor C2, because the internal configuration of the unit capacitor $C_0$ is common to the unit capacitor C of the variable gain capacitors Cc0 to Cc(m−1).

In the grounding switch circuit 308, for each variable gain capacitor Cc0 to Cc(m−1), p switches SW1 to SWp are connected to weighted basic unit capacitors $C_0$ in a one-to-one correspondence.

The switches SW1 to SWp are switched so that the ground potential when the variable gain capacitors Cc0 to Cc(m−1) are grounded is switched between the power supply and the ground. According to the set value of the upper m-bits of the gain control signal GC, a desired combination of the variable gain capacitors Cc0 to Cc(m−1) and the grounding switch circuit 308 side are connected.

In the grounding switch circuit 308, each bit of the control signal ATTCNT[p:1] controls a different one of p switches SW1 to SWp for the weighted capacitors in such a manner that as the bits move from the most significant bit (MSB) to the lower bits, the weights of the weighted capacitors $C_0$ of the respective switches decreases. Accordingly, for example, when the set value of the ATTCNT[p:1] is 3 (decimal), as FIG. 16 illustrates, the SW1 and SW2 which are controlled by the lower two bits of the ATTCNT[p:1] select the power supply side, and the SW3 to SWp select the ground side.

The gain of the power supply noise superimposed on the output of the attenuator 304 is understood to be approximately equal to the attenuation ratio when the power supply is an input, and thus, the gain is given by the following Equation 9.

[Math. 8]

$$G(x, y) = \frac{\left(\alpha \cdot C + \sum_{k=m-1-x}^{m-1} (2^k \cdot C)\right) \times \frac{y}{2^p - 1}}{\alpha \cdot C + \sum_{k=0}^{m-1} (2^k \cdot C)} \quad \text{(Equation 9)}$$

Here, x is the boundary bit (0 to m−1) of the temperature decoding signal of the gain control signal GC (output of the decoding circuit 309), and y is the set value (decimal) of the ATTCNT[p:1]. The term in the bracket of numerator represents the total capacitance value of ground capacitors, and is multiplied by the rate of the set value of the ATTCNT[p:1] to be the value of the numerator.

In the above Equation 9, the value of the denominator is the total capacitance value of the capacitors included in the attenuator 304, and is constant regardless of the values of x and y. On the other hand, the gain of the power supply noise superimposed depends on the set value of the gain control signal GC and the set value of the ATTCNT[p:1]. In particular, at the time of high gain when the ground capacitors increase, the gain in which the power supply noise is superimposed can be increased with an increase in the set value of the ATTCNT[p:1].

As described above, according to Embodiment 4, the attenuator 304 serves part of the variable gain function. This increases the gain adjustment range of the power supply noise superimposed on the output of the attenuator 304 at the time of high gain when the attenuation ratio is low. Accordingly, at the time of high gain where a horizontal line is noticeable, flexibility of the adjustment of the amount of superimposed power supply noise is increased.

In Embodiment 4, the control of the upper bits of the gain control signal is 6 dB step. This is because the weights of the variable gain capacitors are increased by powers of 2. Any other weights can be adopted as desired. The same advantageous effects can be obtained with a configuration where the control of the upper bits of the gain control signal is varied with a different step size, in a similar manner to Embodiment 3.

Embodiment 5

The solid-state imaging device according to each of Embodiments 1 to 4 is suitable for the imaging device (image input device, image sensor) in a mobile device such as a smart phone and a mobile phone, and an imaging apparatus such as a camera module which is a digital camera, a digital still camera, and the like.

Figure 17:
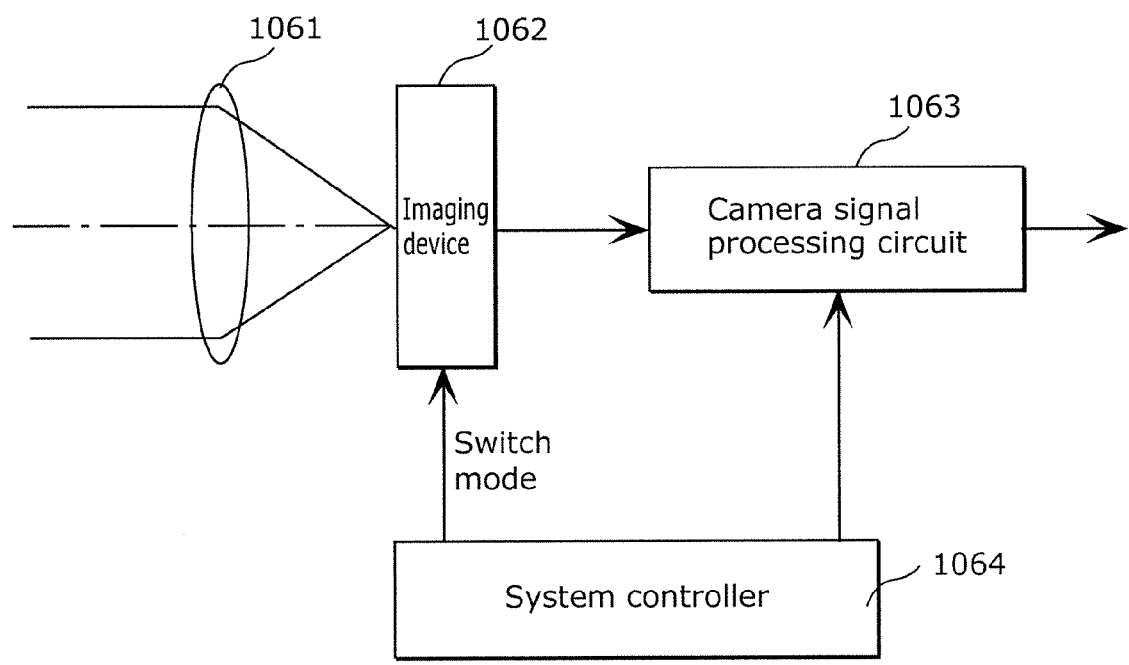
FIG. 17 is a block diagram of an example of a configuration of an imaging apparatus (camera) according to Embodiment 5.
Figure 18:
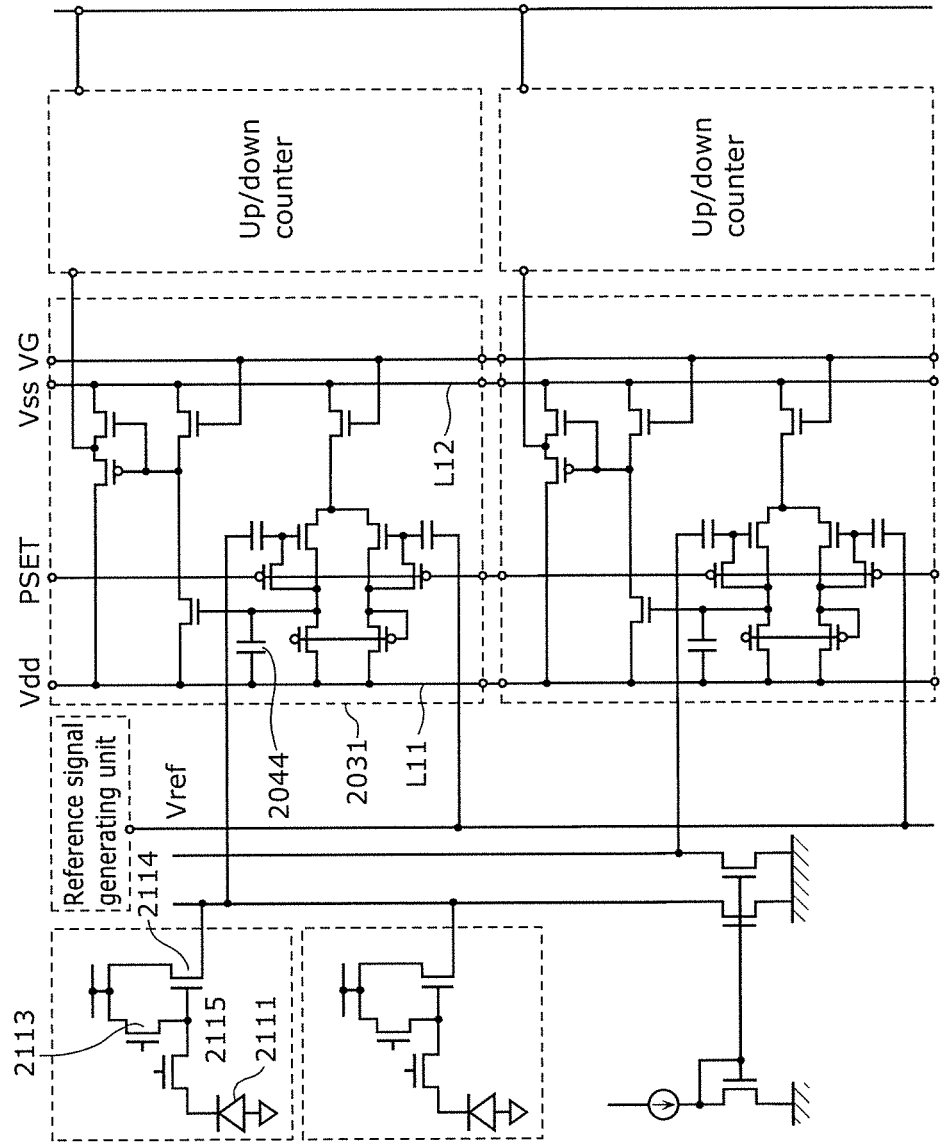
FIG. 18 illustrates a circuit configuration of a conventional solid-state imaging device disclosed in PTL 1.

FIG. 17 is a block diagram of an example of a configuration of an imaging apparatus (camera) according to Embodiment 5. As FIG. 17 illustrates, the imaging apparatus according to Embodiment 5 includes, for example, an optical system including a lens 1061, an imaging device (image sensor) 1062, a camera signal processing circuit 1063, and a system controller 1064.

The lens 1061 causes image light from an object to be formed on an imaging plane of the imaging device 1062.

The imaging device 1062 outputs an image signal obtained by converting, on a per-pixel basis, the image light formed on the imaging plane by the lens 1061, into an electric signal. The solid-state imaging device according to Embodiment 1, 2, 3 or 4 is used as the imaging device 1062.

The camera signal processing circuit 1063 performs various signal processing on the image signal outputted from the imaging device 1062.

The system controller 1064 performs control on the imaging device 1062 and the camera signal processing circuit 1063. For example, the imaging device (image sensor) 1062, the camera signal processing circuit 1063, and the system controller 1064 may be formed on the same chip, separate chips may form the camera module, or part of the elements may be formed on the same chip.

The solid-state imaging device and the imaging apparatus according to the present disclosure have been described based on the embodiments. However, the solid-state imaging device and the imaging apparatus according to the present disclosure are not limited to the embodiments. The present disclosure includes other embodiments which can be achieved through combination of arbitrary structural elements in the embodiments, a variation obtained by making various changes, which those skilled in the art would conceive, to the embodiments without departing from a scope of the present disclosure, or various devices including the solid-state imaging device according to the present disclosure.

INDUSTRIAL APPLICABILITY

A solid-state imaging device according to present disclosure suppresses disturbance noise such as power supply noise. The solid-state imaging device according to the present disclosure is useful, in particular, for a mobile phone (smart phone) camera, a digital still camera, a video camera, an in-vehicle camera, a monitoring camera, a medical camera, and the like which provide high performance.

The invention claimed is:

1. A solid-state imaging device comprising:
an imaging region including a plurality of unit cells arranged in rows and columns, each of the unit cells including at least one light receiving unit, a transfer transistor which transfers a signal charge photoelectrically converted by the at least one light receiving unit, and an amplifying transistor which outputs an amplified signal corresponding to an amount of the signal charge;
a plurality of column signal lines each connected to a source electrode of the amplifying transistor, for receiving an output signal from the amplifying transistor;
a pixel power supply line connected to a drain electrode of the amplifying transistor, for supplying a power supply voltage to the amplifying transistor;
a plurality of constant current source transistors each connected to a different one of the column signal lines; and
a bias circuit which controls an amount of current to be supplied to each of the constant current source transistors, based on a variation in the power supply voltage.

2. The solid-state imaging device according to claim 1, wherein the bias circuit includes a voltage-to-current converting circuit having a conversion gain which is positive, the conversion gain being for converting the power supply voltage into a current.

3. The solid-state imaging device according to claim 1, wherein the bias circuit includes:
a first capacitor connected to the power supply voltage; and
a second capacitor connected to a first node to which a voltage other than the power supply voltage is applied, and
an amount of current supplied by each of the constant current source transistors is determined based on a ratio of a capacitance value of the first capacitor to a capacitance value of the second capacitor.

4. The solid-state imaging device according to claim 3, wherein the first node is set to a ground potential.

5. The solid-state imaging device according to claim 3, wherein the first capacitor includes:
a second node connected to the power supply voltage; and
a third node selectively set to a high impedance state or a low impedance state.

6. The solid-state imaging device according to claim 5, wherein the first capacitor included in the bias circuit comprises a plurality of first capacitors, and
the bias circuit further includes a first control transistor connected to the third node included in at least one of the first capacitors, the first control transistor including a function of changing a ratio of capacitance values of the first capacitors to the capacitance value of the second capacitor.

7. The solid-state imaging device according to claim 6, wherein the bias circuit changes the ratio of the capacitance value of the first capacitor to the capacitance value of the second capacitor when the amplifying transistors of two or more of the unit cells are simultaneously activated.

8. The solid-state imaging device according to claim 3, wherein the second capacitor included in the bias circuit comprises a plurality of second capacitors, and
the bias circuit further includes a second control transistor connected to a fourth node connected to the at least one of the second capacitors, the fourth node being different from the first node connected to the at least one of the second capacitors, the second control transistor including a function of changing a ratio of the capacitance value of the first capacitor to capacitance values of the second capacitors.

9. The solid-state imaging device according to claim 1, wherein the constant current source transistors and the bias circuit are disposed on physically different sides of the imaging region.

10. The solid-state imaging device according to claim 1, wherein the constant current source transistors and the bias circuit are disposed on a physically same side of the imaging region.

11. A solid-state imaging device comprising:
an imaging region including a plurality of unit cells arranged in rows and columns, each of the unit cells including at least one light receiving unit, a transfer transistor which transfers a signal charge photoelectrically converted by the at least one light receiving unit, and an amplifying transistor which outputs an amplified signal corresponding to an amount of the signal charge;
a plurality of column signal lines each connected to a source electrode of the amplifying transistor, for receiving an output signal from the amplifying transistor;
a pixel power supply line connected to a drain electrode of the amplifying transistor, for supplying a power supply voltage to the amplifying transistor;
a reference signal generating circuit which generates a reference voltage which temporally varies based on a variation in the power supply voltage; and
an analog-to-digital (AD) converting unit which compares a potential of each of the column signal lines with the reference voltage, and converts an analog voltage which is the output signal into a digital voltage.

12. The solid-state imaging device according to claim 11, wherein the reference signal generating circuit includes a third capacitor and a fourth capacitor, and
the reference voltage corresponds to a differential voltage between the power supply voltage and a ground potential, the differential voltage varying at a ratio of a capacitance value of the third capacitor to a capacitance value of the fourth capacitor.

13. The solid-state imaging device according to claim 12, wherein the fourth capacitor includes a plurality of capacitors connected in parallel, and
the reference signal generating circuit (i) sets each of a plurality of ground nodes of the capacitors of the fourth capacitor to a power supply potential or the ground potential, and (ii) adjusts, to a predetermined ratio based on a first control signal, a ratio of a total capacitance value of one or more of the capacitors having the ground nodes set to the power supply potential to a total capacitance value of one or more of the capacitors having the ground nodes set to the ground potential.

14. The solid-state imaging device according to claim 12, wherein the reference signal generating circuit includes:
a ramp signal generating circuit;
an attenuator including: a fifth capacitor having a first terminal connected to an output terminal of the ramp signal generating circuit; and a sixth capacitor connected between a second terminal of the fifth capacitor and a ground potential, the attenuator reducing, at a predetermined rate, an amplitude of a ramp signal by voltage division by the fifth capacitor and the sixth capacitor; and a buffer circuit which converts a voltage signal of a voltage division point between the fifth capacitor and the sixth capacitor into a voltage signal having a low impedance and outputs the voltage signal having the low impedance, the fourth capacitor includes a plurality of capacitors connected in parallel, and the reference signal generating circuit (i) sets each of a plurality of ground nodes of the capacitors of the fourth capacitor to a power supply potential or a ground potential, and (ii) adjusts, to a predetermined ratio based on a second control signal, a ratio of a total capacitance value of one or more of the capacitors having the ground nodes set to the power supply potential to a total capacitance value of one or more of the capacitors having the ground nodes set to the ground potential.

15. The solid-state imaging device according to claim 12, wherein the reference signal generating circuit further includes a first switch for short-circuiting terminals across the fifth capacitor, and the reference signal generating circuit controls on and off of the first switch based on a third control signal.

16. The solid-state imaging device according to claim 11, wherein the reference signal generating circuit includes:

a ramp signal generating circuit; and an attenuator including: a fifth capacitor having a first terminal connected to an output terminal of the ramp signal generating circuit; and a sixth capacitor connected between a second terminal of the fifth capacitor and a ground potential, the attenuator reducing, at a predetermined rate, an amplitude of a ramp signal by voltage division by the fifth capacitor and the sixth capacitor, and the reference signal generating circuit outputs a voltage which is based on a voltage of a voltage division point between the fifth capacitor and the sixth capacitor.

17. The solid-state imaging device according to claim 16, wherein the sixth capacitor includes a plurality of capacitors connected in parallel, and the reference signal generating circuit (i) sets each of a plurality of ground nodes of the capacitors of the sixth capacitor to a power supply potential or a ground potential, and (ii) adjusts, to a predetermined ratio based on a first control signal, a ratio of a total capacitance value of one or more of the capacitors having the ground nodes set to the power supply potential to a total capacitance value of one or more of the capacitors having the ground nodes set to the ground potential.

18. The solid-state imaging device according to claim 11, wherein the reference signal generating circuit includes:

a plurality of seventh capacitors having: first terminals respectively connected to a plurality of second switches; and second terminals commonly connected to an input of a buffer circuit, the second switches each connecting and disconnecting a ground node and an output terminal of a ramp signal generating circuit which outputs a sloped signal having a constant voltage variation per unit time; and an attenuator which varies an attenuation ratio by changing, based on a fourth control signal, a ratio of capacitance values of one or more of the seventh capacitors connected to the output terminal of the ramp signal generating circuit to capacitance values of one or more of the seventh capacitors connected to the ground node, and the reference signal generating circuit includes a function of setting each of the ground nodes to a power supply potential or a ground potential, and adjusts the ratio to a predetermined ratio based on a first control signal.

19. A solid-state imaging device comprising:

an imaging region including a plurality of unit cells arranged in rows and columns, each of the unit cells including at least one light receiving unit, and a transfer unit configured to transfer a signal charge photoelectrically converted by the at least one light receiving unit;

an amplifying transistor which outputs an amplified signal corresponding to an amount of the signal charge transferred by the transfer unit;

a power supply line connected to a drain electrode of the amplifying transistor, for supplying a power supply voltage to the amplifying transistor;

a constant current source transistor connected to the amplifying transistor; and a bias circuit which controls an amount of current to be supplied to the constant current source transistor, based on a variation in the power supply voltage.

20. An imaging apparatus comprising:

the solid-state imaging device according to claim 1; and an optical system which guides light from an object to an imaging plane of the at least one light receiving unit.

* * * * *